US012647747B2

(12) United States Patent
Nakagawa et al.

(10) Patent No.: US 12,647,747 B2
(45) Date of Patent: Jun. 2, 2026

(54) INFORMATION PROCESSING DEVICE, INFORMATION PROCESSING METHOD, AND PROGRAM

(71) Applicant: Sony Group Corporation, Tokyo (JP)

(72) Inventors: Toru Nakagawa, Chiba (JP); Masashi Fujihara, Kanagawa (JP); Akihito Nakai, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 145 days.

(21) Appl. No.: 18/272,088

(22) PCT Filed: Jan. 4, 2022

(86) PCT No.: PCT/JP2022/000011
§ 371 (c)(1),
(2) Date: Jul. 12, 2023

(87) PCT Pub. No.: WO2022/163308
PCT Pub. Date: Aug. 4, 2022

(65) Prior Publication Data
US 2024/0305950 A1 Sep. 12, 2024

(30) Foreign Application Priority Data
Jan. 29, 2021 (JP) ................................ 2021-013881

(51) Int. Cl.
*H04S 7/00* (2006.01)

(52) U.S. Cl.
CPC .............. *H04S 7/306* (2013.01); *H04S 7/301* (2013.01); *H04S 2420/01* (2013.01)

(58) Field of Classification Search
CPC ....... H04S 7/306; H04S 7/301; H04S 2420/01
See application file for complete search history.

(56) References Cited

U.S. PATENT DOCUMENTS 7,936,887 B2 * 5/2011 Smyth .................... H04S 7/304 381/310
10,743,128 B1 8/2020 Johansson et al.
(Continued)

FOREIGN PATENT DOCUMENTS

JP 2007-110206 A 4/2007
JP 2009-260574 A 11/2009
(Continued)

OTHER PUBLICATIONS

International Search Report and English translation thereof mailed Feb. 22, 2022 in connection with International Application No. PCT/JP2022/000011.

*Primary Examiner* — Daniel R Sellers
(74) *Attorney, Agent, or Firm* — Wolf, Greenfield & Sacks, P.C.

(57) ABSTRACT

The present technique relates to an information processing device, an information processing method, and a program that allow a user to adjust a personalized transfer function. The information processing device according to the present technique comprises an adjustment unit that adjusts personalized transfer characteristics, which are transfer characteristics of sound in a measurement environment and are personalized to a user, in response to an operation performed by the user. The information processing device according to the present technique further comprises a presentation unit that presents, to the user, contents of reference information referred to at the time of adjusting the personalized transfer characteristics, along with the personalized transfer characteristics. The present technique can be applied to, for example, a system that mixes audio of content such as movies.

15 Claims, 23 Drawing Sheets

(56) References Cited

U.S. PATENT DOCUMENTS

| | | | | |
|---|---|---|---|---|
| 2007/0270988 | A1* | 11/2007 | Goldstein | H04R 5/04 381/309 |
| 2012/0201405 | A1* | 8/2012 | Slamka | H04S 7/306 381/307 |
| 2013/0243226 | A1 | 9/2013 | Tokoro et al. | |
| 2014/0153727 | A1* | 6/2014 | Walsh | H04S 7/305 381/58 |
| 2017/0339504 | A1* | 11/2017 | Bharitkar | H04S 3/004 |
| 2020/0257548 | A1 | 8/2020 | Milne et al. | |

FOREIGN PATENT DOCUMENTS

| | | | |
|---|---|---|---|
| JP | 2013-219731 | A | 10/2013 |
| JP | 2017028526 | A | 2/2017 |
| JP | 2019153943 | A | 9/2019 |
| JP | 2020136752 | A | 8/2020 |
| JP | 2020156029 | A | 9/2020 |
| JP | 2020-201479 | A | 12/2020 |

* cited by examiner

INFORMATION PROCESSING DEVICE, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2022/000011, filed in the Japanese Patent Office as a Receiving Office on Jan. 4, 2022, which claims priority to Japanese Patent Application Number JP2021-013881, filed in the Japanese Patent Office on Jan. 29, 2021, each of which is hereby incorporated by reference in its entirety.

TECHNICAL FIELD

The present technique relates to an information processing device, an information processing method, and a program, and particularly to an information processing device, an information processing method, and a program that allow a user to adjust a personalized transfer function.

BACKGROUND ART

A personalized head related transfer function (HRTF) is obtained by, for example, convolving the inverse characteristics of the headphones-to-ear HRTF with respect to the speaker-to-ear HRTF.

By performing calculations using the personalized HRTF, it is possible to localize the audio image to a predetermined position and three-dimensionally reproduce the sound heard from headphones. The sound heard through the headphones is a reproduction of the sound from the sound source in an HRTF measurement environment.

CITATION LIST

Patent Literature

[PTL 1]
JP 2009-260574A

SUMMARY

Technical Problem

A personalized HRTF is unique to the user and is usually used in calculations as a fixed value. Therefore, the user cannot adjust the sound field or sound quality by adjusting the personalized HRTF itself.

The present technique has been devised in view of such circumstances and aims to allow a user to adjust a personalized transfer function.

Solution to Problem

An information processing device of one aspect of the present technique is provided with an adjustment unit that adjusts personalized transfer characteristics, which are transfer characteristics of sound in a measurement environment and are personalized to a user, in response to an operation performed by the user.

In one aspect of the present technique, the personalized transfer characteristics, which are transfer characteristics of sound in a measurement environment and personalized to a user, are adjusted in response to an operation performed by the user.

DESCRIPTION OF EMBODIMENTS

An embodiment for implementing the present technique will be described below. The description will be made in the following order.

1. Configuration of sound production system
2. Overall flow of operation in sound production system
3. Configuration and operation of information processing device
4. Configuration and operation of reproducing device
5. Modifications 1. Configuration of Sound Production System FIG. 1 is a diagram showing a configuration example of a sound production system according to an embodiment of the present technique.

Figure 1:
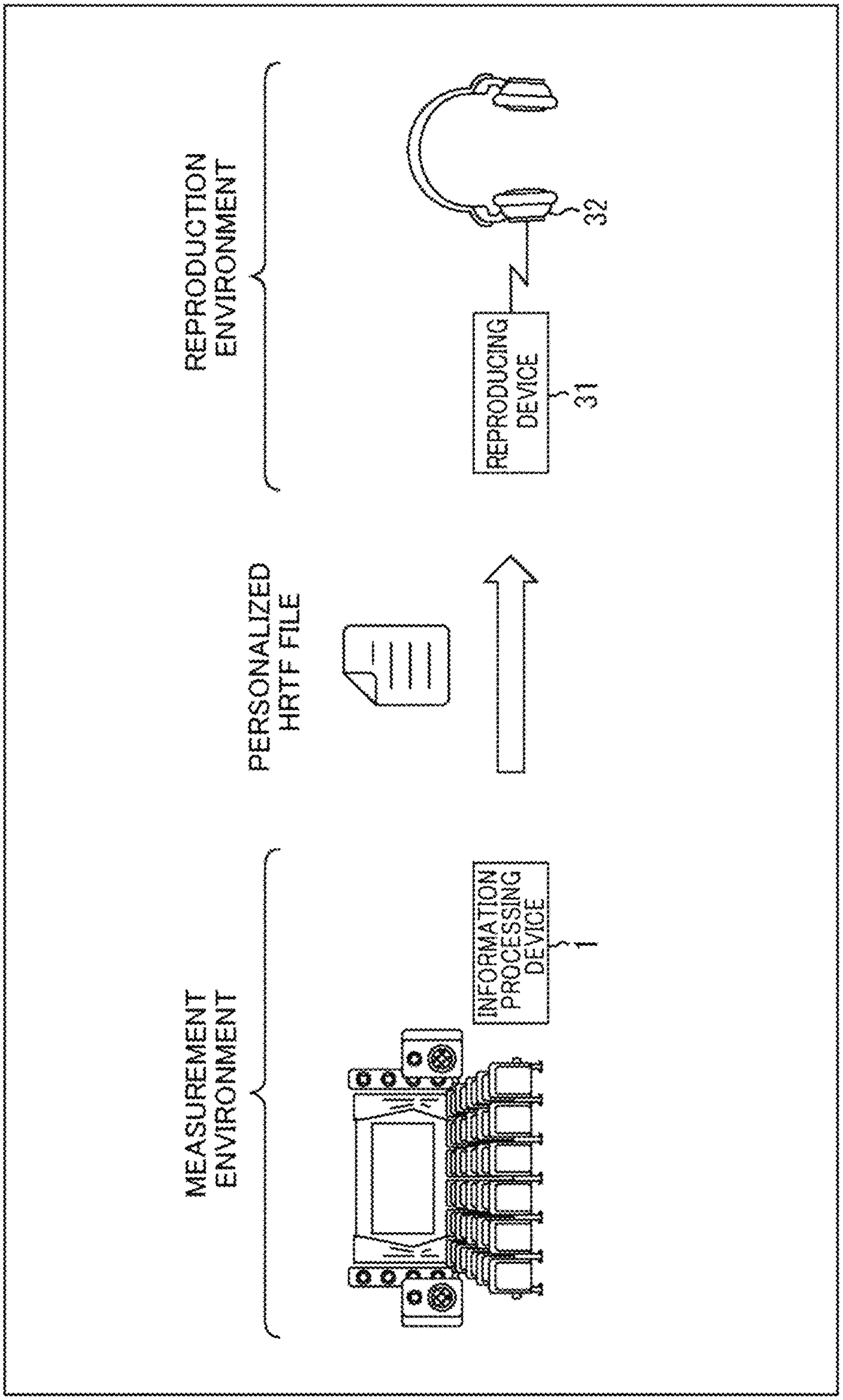
FIG. 1 is a diagram showing a configuration example of a sound production system according to an embodiment of the present technique.

The sound production system in FIG. 1 is configured using a device on the measurement environment side and a device on the reproduction environment side. The sound production system of FIG. 1 is, for example, a system used for producing audio for movies.

The audio of a movie includes various sounds such as sound effects, environmental sounds, and BGM, as well as audio of characters such as lines of actors and narrations. In the following, when there is no need to distinguish between the types of sounds, the sounds will be collectively described as audio, but in reality, the sounds of a movie include sounds other than audio.

As shown on the left side of FIG. 1, the measurement environment is called a dubbing stage or the like, and is a movie theater used for sound production. A movie theater is provided with a plurality of speakers along with a screen. In addition, the movie theater is provided with an information processing device 1 that acquires a measurement result of HRTF (Head-Related Transfer Function) representing the transfer characteristics of sound in the measurement environment and generates information such as an HRTF file. The information processing device 1 is configured by, for example, a PC.

In the measurement environment of the sound production system shown in FIG. 1, a personalized HRTF, which is an HRTF personalized to the producer of the audio of a movie, is measured. The personalized HRTF is adjusted so as to be able to reproduce the same sound quality as that of the measurement environment and to reproduce the same sound field as that of the measurement environment. Adjustment of the personalized HRTF is performed by, for example, the producer himself/herself who performs editing in the reproduction environment, while listening to the reproduced sound in which the personalized HRTF is used.

A personalized HRTF file is generated by the information processing device 1 by recording a personalized HRTF adjustment value along with personalized HRTF data As indicated by the arrow in FIG. 1, the personalized HRTF file in which the HRTF data representing the personalized HRTF measurement result and the adjustment value are recorded is provided to a reproducing device 31 provided in the reproduction environment. The personalized HRTF file may be provided to the reproducing device 31 via a network such as the Internet, or may be provided using a recording medium such as a flash memory.

The reproduction environment is an environment in a location different from the movie theater, such as a studio or the home of the producer. The reproduction environment may be prepared at the same location as the measurement environment.

The reproduction environment is provided with the reproducing device 31, which is a device used for editing the audio of a movie. The reproducing device 31 is also configured by, for example, a PC. The producer uses headphones 32 in the reproduction environment such as a home, to edit the audio of a movie. The headphones 32 is an output device prepared in the reproduction environment.

In the reproducing device 31, an audio signal is reproduced using a personalized HRTF. By performing the reproduction using the personalized HRTF, audio that is output from a speaker of the movie theater used for measuring the personalized HRTF is reproduced.

During reproduction of an audio signal, the reproducing device 31 performs adjustment based on an adjustment value, on the personalized HRTF used for reproduction of the audio signal at the reproducing device 31. When the reproduction of the audio signal is performed using the adjusted personalized HRTF, the sound quality of the audio heard from the headphones 32 becomes the same as the sound quality in the measurement environment. In addition, the sound field of the sound heard from the headphones 32 will be the same as the sound field in the measurement environment.

Thus, in the sound production system shown in FIG. 1, it is possible to adjust the personalized HRTF itself. Normally, audio reproduced using a personalized HRTF is audio obtained by reproducing audio in the measurement environment more faithfully than audio reproduced using a non-personalized HRTF (HRTF commonly used by many people). However, depending on the acoustic characteristics of the measurement environment and the device characteristics of the headphones used for reproduction, the difference between the audio reproduced using the personalized HRTF and the audio in the measurement environment may be felt.

By adjusting the personalized HRTF itself, the sound quality and the sound field are adjusted to reproduce the audio in the measurement environment. The producer can edit the audio while listening to the adjusted audio based on his/her own perception.

This allows the producer to edit under the same sound environment as in a movie theater by using the headphones 32. In other words, the same sound environment as in a movie theater is virtually reproduced in the reproduction environment.

Usually, in a production environment for audio of a movie, the reproduced sound output from the speakers of a movie theater is used as a reference for the production. According to the sound production system of the present technique, the producer can perform editing at home or elsewhere, since there is no need to go to a movie theater.

2. Overall Flow of Operation in Sound Production System

A flow of operation performed in each of the measurement environment and the reproduction environment will be described. In the measurement environment, measurement and adjustment are performed respectively.

<Flow of Measurement in Measurement Environment>

Figure 2:
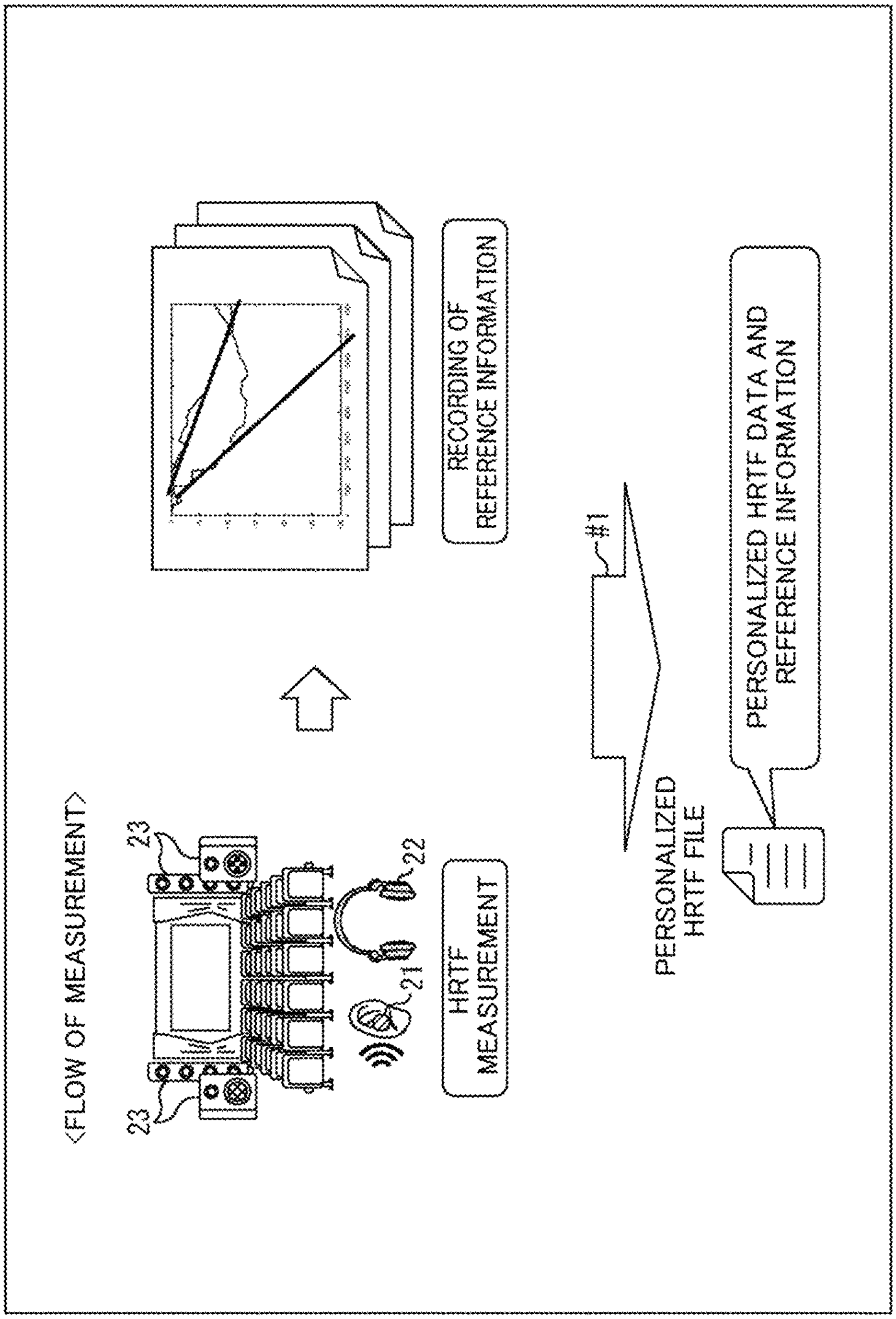
FIG. 2 is a diagram showing a flow of measurement in a measurement environment.

FIG. 2 is a diagram showing the flow of measurement in the measurement environment.

The measurement in the measurement environment mainly include measurement of an HRTF and recording of reference information.

• HRTF Measurement

As shown on the left side of FIG. 2, the HRTF measurement is performed with, for example, a listener sitting in a predetermined seat in a movie theater with a microphone 21 attached to an earhole.

Here, the producer him/herself of audio of a movie is the listener. By allowing the producer him/herself to be the listener, the HRTF personalized to the producer is measured. Since HRTFs differ depending on the shapes of the ears and the like, the audio image can be localized with high accuracy by using a personalized HRTF.

In this state, reproduced sound is output from a speaker 23 in the movie theater, and the personalized HRTF between the speaker 23 and the ears (e.g., positions of the earholes, positions of the eardrums) is measured.

After measuring the personalized HRTF between the speaker 23 and the ears, the listener puts on the headphones 22 so as to cover the ears to which the microphone 21 is attached. The headphones 22 are an output device prepared in the measurement environment.

In this state, the reproduced sound is output from the headphones 22, and the personalized HRTF between the headphones 22 and the ears is measured. As the reproduced sound from the headphones 22, for example, the same sound as the reproduced sound output from the speaker 23 is used.

The information processing device 1 acquires the personalized HRTF between the speaker 23 and the ears and the personalized HRTF between the headphones 22 and the ears thus measured. The information processing device 1 generates personalized HRTF data including the personalized HRTF between the speaker 23 and the ears and inverse correction data.

The inverse correction data is data representing the inverse characteristics of the personalized HRTF between the headphones 22 and the ears. The inverse correction data is used to correct the personalized HRTF during reproduction in the reproduction environment. This correction is performed by superimposing the inverse correction data on the personalized HRTF between the speaker 23 and the ears, that is, by canceling the personalized HRTF between the headphones 22 and the ears.

The correction of the personalized HRTF makes it possible to obtain a highly accurate HRTF between the speaker 23 and the ears, which is personalized to the producer and takes into account the individual differences of the headphones 22.

• Recording of Reference Information

As shown on the right side of FIG. 2, reference information, which is information referred to by the producer when adjusting the personalized HRTF, is obtained. The reference information is obtained based on, for example, the characteristics of the measurement environment and the device characteristics of the headphones 22. Details of the reference information are described below.

A personalized HRTF file is generated as indicated by arrow #1, by recording the personalized HRTF data generated by the HRTF measurement and the reference information.

<Flow of Adjustment in Measurement Environment>

Figure 3:
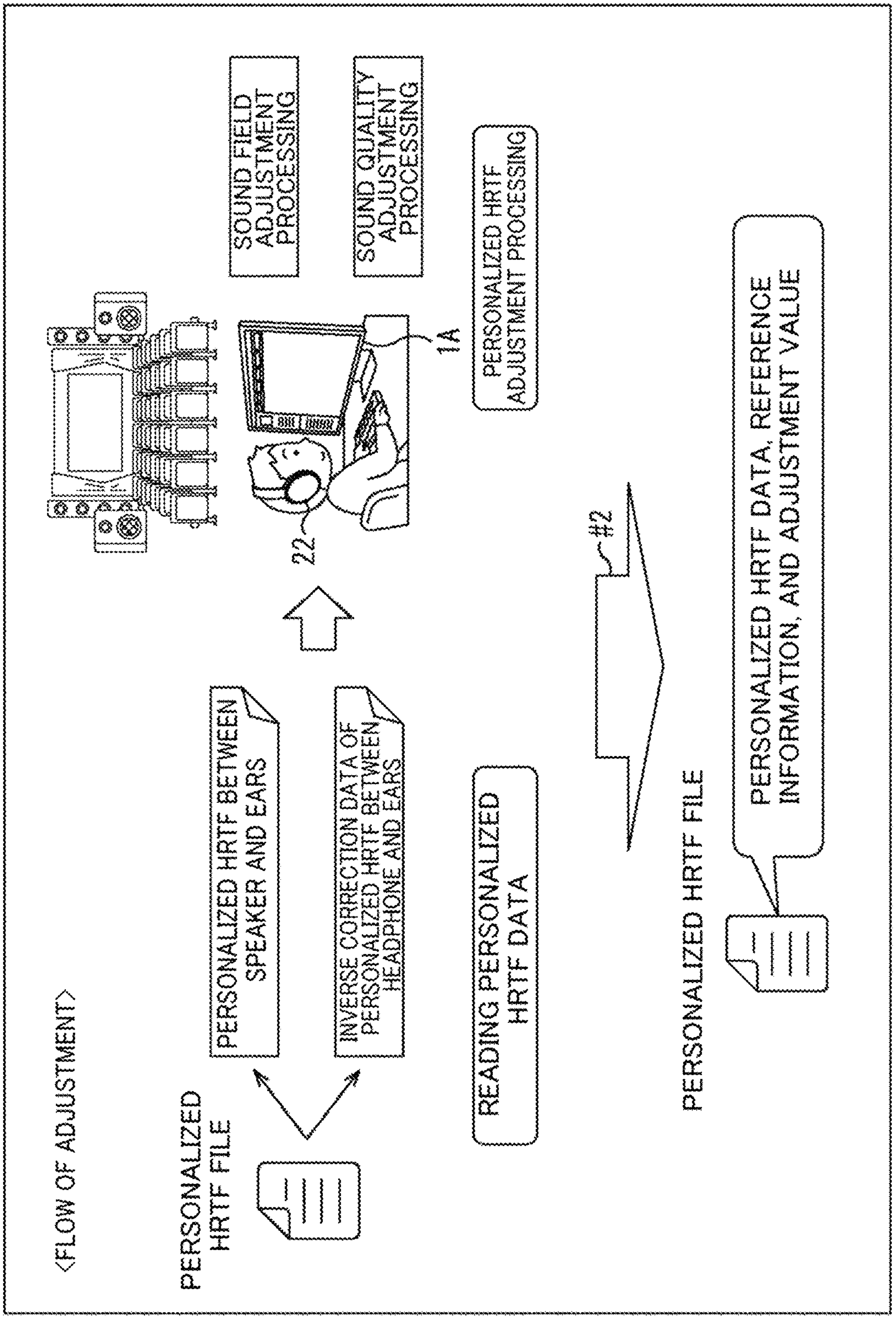
FIG. 3 is a diagram showing a flow of adjustment in the measurement environment.

FIG. 3 is a diagram showing the flow of adjustment in the measurement environment.

In the information processing device 1 prepared for the measurement environment, the personalized HRTF between the speaker 23 and the ears and the inverse correction data of the personalized HRTF between the headphones 22 and the ears are read from the personalized HRTF file as the personalized HRTF data, as shown on the left side of FIG. 3.

As shown on the right side of FIG. 3, the headphones 22 are connected to the information processing device 1. The audio reproduced using the personalized HRTF data read from the personalized HRTF file is output from the headphones 22.

Figure 4:
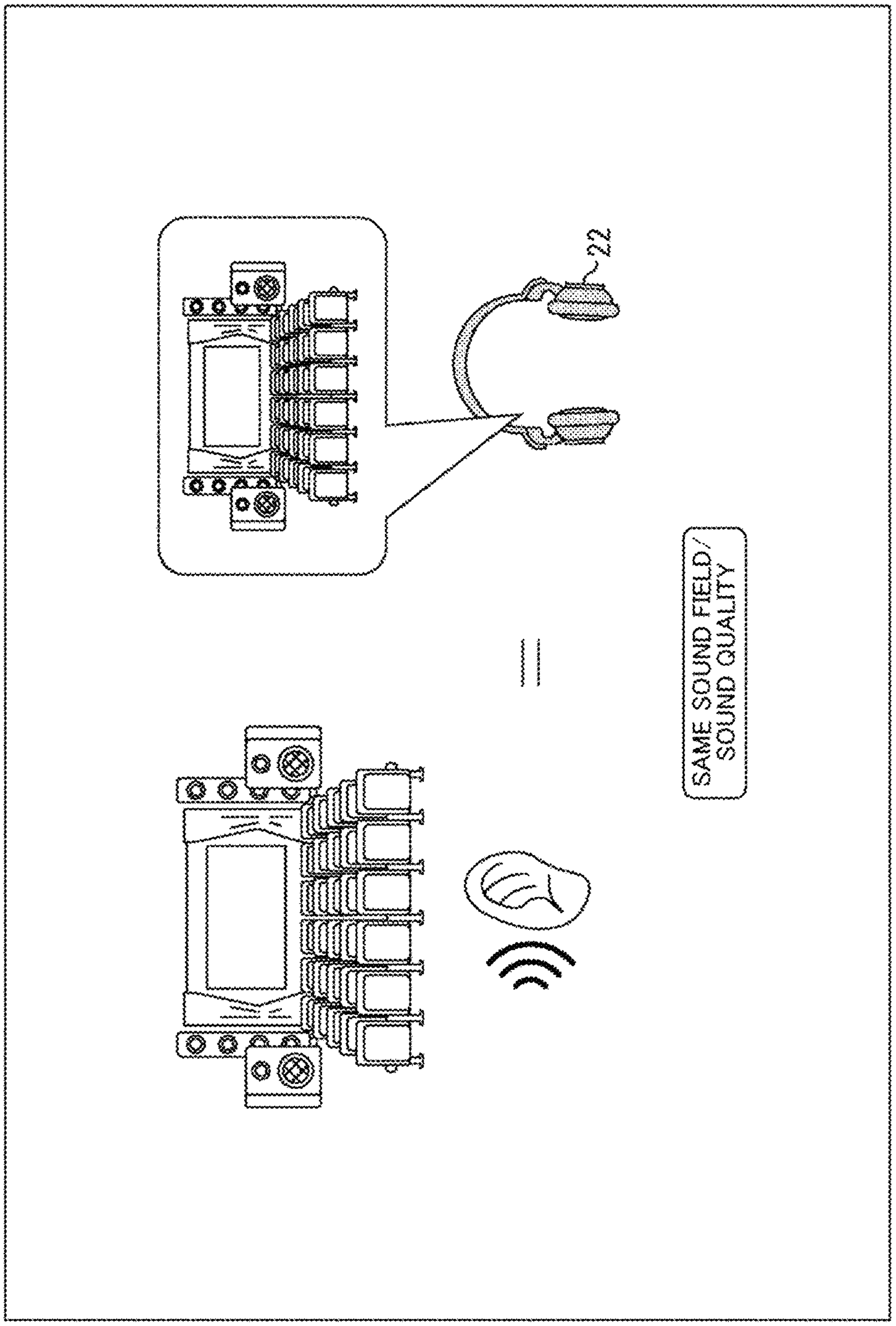
FIG. 4 is a diagram showing an example of the adjustment in the measurement environment.

The producer sees a display 1A and operates the information processing device 1 to adjust the sound field and the sound quality of the reproduced sound output from the headphones 22 to reproduce the sound field and sound quality of the reproduced sound output from the speaker 23, respectively, as shown in FIG. 4, for example. An adjustment screen on the display 1A shows, for example, information based on the personalized HRTF data and the reference information.

For example, the producer adjusts a reverberation component in the reproduced sound output from the headphones 22 by referring to the reference information used to adjust the sound field. In the information processing device 1, an adjustment value used to adjust the personalized HRTF between the speaker 23 and the ears is generated in response to an operation by the producer.

The producer also adjusts the sound quality taking into account the characteristics of the headphones 22, by referring to the reference information used to adjust the sound quality. In the information processing device 1, an adjustment value used to adjust the inverse correction data of the personalized HRTF between the headphones 22 and the ears is generated in response to an operation by the producer.

The adjustment values for the personalized HRTF data thus generated are recorded in the personalized HRTF file together with the personalized HRTF data and reference information, as shown at the end of arrow #2 shown in FIG. 3.

<Flow of Reproduction in Measurement Environment>

Figure 5:
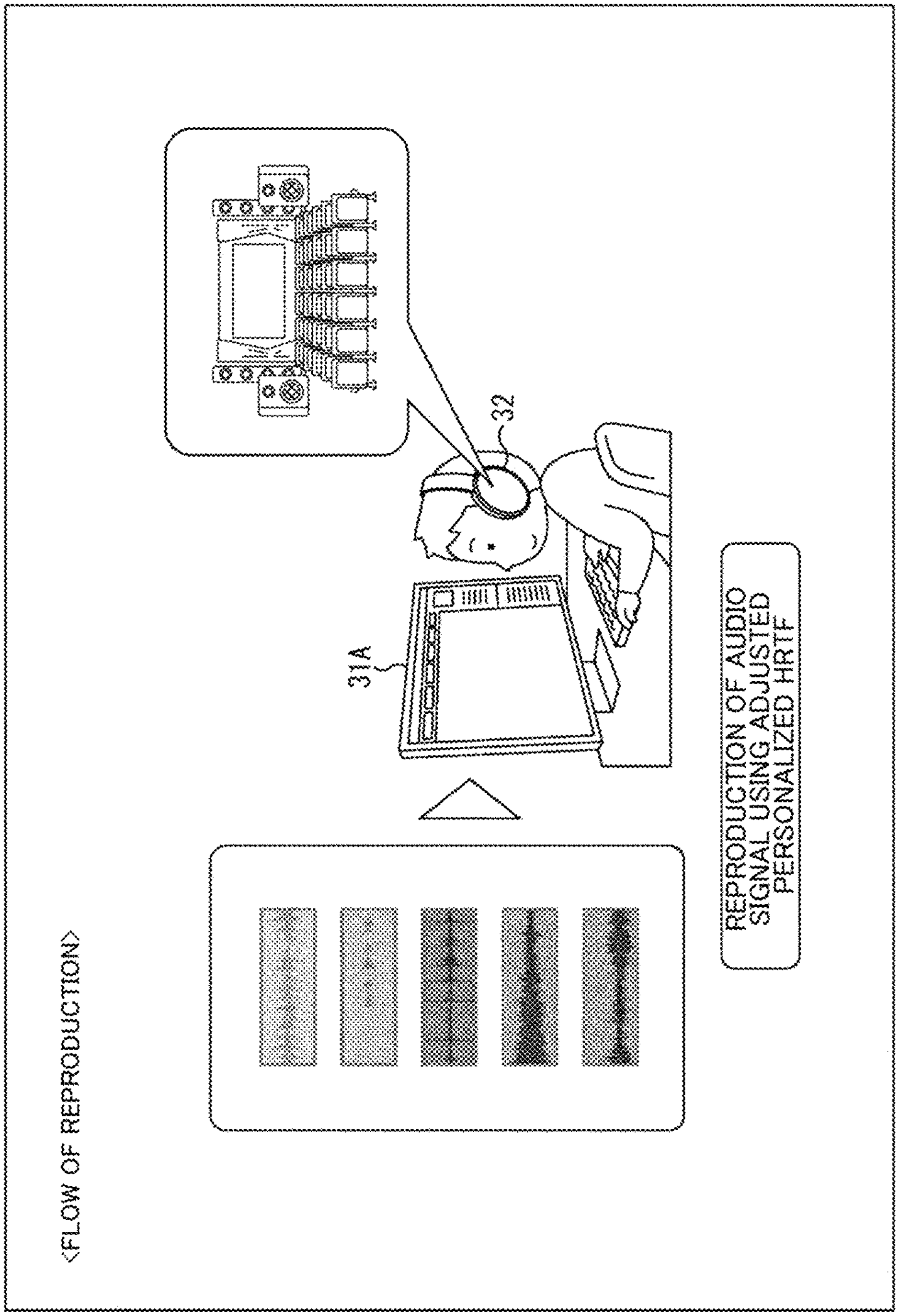
FIG. 5 is a diagram showing a flow of reproduction in a reproduction environment.

FIG. 5 is a diagram showing the flow of reproduction in a reproduction environment.

The headphones 32 are connected to the reproducing device 31 provided in the reproduction environment. The headphones 32 are, for example, headphones of the same model number (headphones with the same specifications), manufactured by the same manufacturer as the headphones 22 used in the measurement environment. The headphones 22 that the producer brings home may be used as the headphones 32.

In the reproducing device 31, the personalized HRTF data recorded in the personalized HRTF file is adjusted based on an adjustment value. The adjusted personalized HRTF data is used to reproduce audio signals of a movie to be edited, such as object audio and channel audio. The audio data constituting audio of a movie includes data of the object audio data or the channel audio.

The producer can edit movie audio while listening to the reproduced sound output in such a way as to reproduce a movie theater as a production environment for the movie audio.

Thus, by adjusting the personalized HRTF data, it is possible to reproduce the sound field and sound quality required in the production of audio and music for a movie.

For example, by adjusting the personalized HRTF between the speaker 23 and the ears, the producer can edit the audio with the sound field adjusted so that the sound is not blurred. In addition, by adjusting the inverse correction data of the personalized HRTF between the headphones 22 and the ears, the producer can improve the reproduction of the sound quality of low frequency sound output from a subwoofer installed in the measurement environment.

3. Configuration and Operation of Information Processing Device

<Configuration of Information Processing Device>

Figure 6:
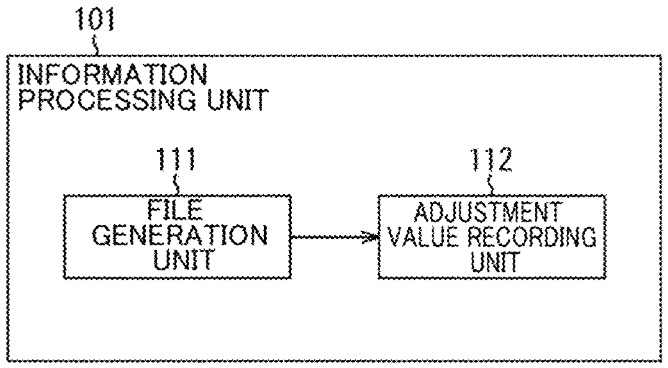
FIG. 6 is a block diagram showing a functional configuration example of an information processing device.

FIG. 6 is a block diagram showing a functional configuration example of the information processing device 1.

In the information processing device 1, an information processing unit 101 is implemented by executing a predetermined program by the CPU of the PC that constitutes the information processing device 1.

The information processing unit 101 is composed of a file generation unit 111 and an adjustment value recording unit 112. At least a part of the configuration of the information processing unit 101 may be implemented by other devices such as an amplifier provided in the measurement environment.

The file generation unit 111 measures personalized HRTFs and generates personalized HRTF files. The personalized HRTF files generated by the file generation unit 111 are supplied to the adjustment value recording unit 112.

The adjustment value recording unit 112 adjusts the personalized HRTF data according to an operation by the producer and records the adjustment values in the personalized HRTF files.

• Configuration of File Generation Unit

Figure 7:
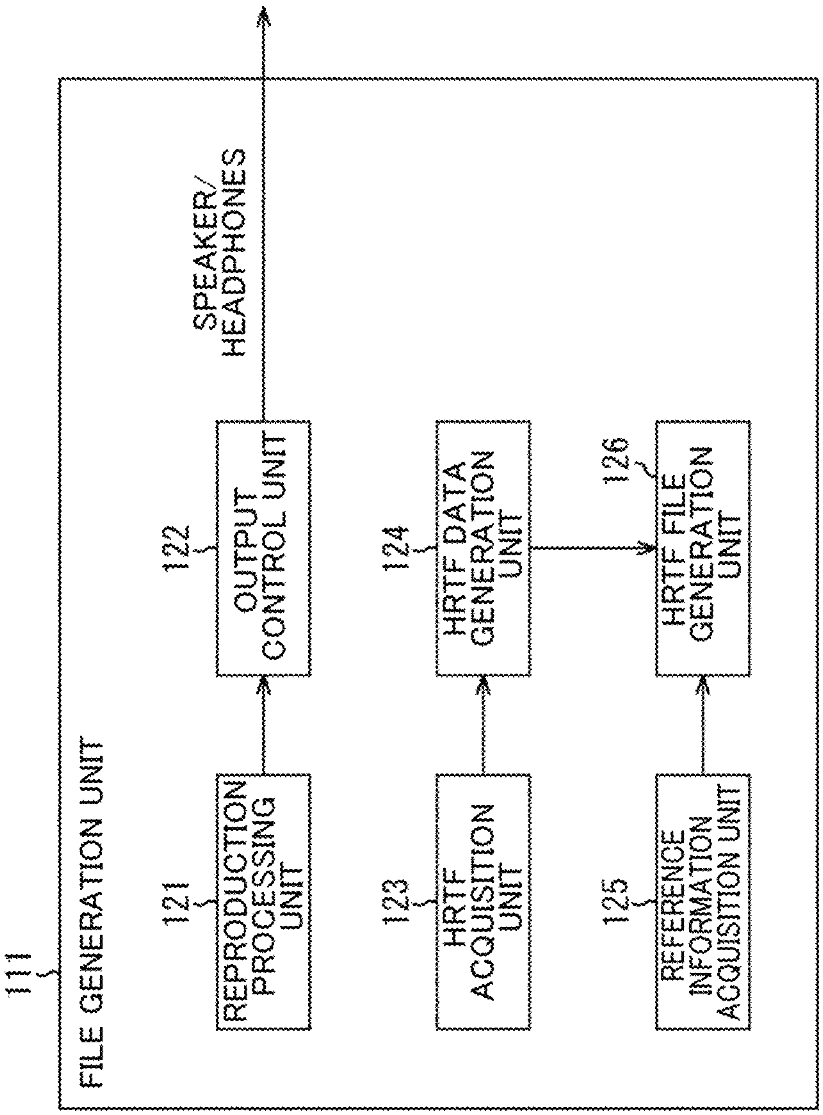
FIG. 7 is a block diagram showing a configuration example of a file generation unit.

FIG. 7 is a block diagram showing a configuration example of the file generation unit 111.

The file generation unit 111 is composed of a reproduction processing unit 121, an output control unit 122, an HRTF acquisition unit 123, an HRTF data generation unit 124, a reference information acquisition unit 125, and an HRTF file generation unit 126.

The reproduction processing unit 121 controls the reproduction of sound to be output from the headphones 22 and the speaker 23. Audio signals obtained by reproducing audio data, such as data of specified signals, are supplied to the output control unit 122.

The output control unit 122 causes reproduced sound corresponding to an audio signal supplied from the reproduction processing unit 121 to be output from the headphones 22 and the speaker 23.

The HRTF acquisition unit 123 acquires the personalized HRTF between the headphones 22 and the ears and the personalized HRTF between the speaker 23 and the ears based on a result of sound collection by the microphone 21. Information representing the personalized HRTFs acquired by the HRTF acquisition unit 123 are supplied to the HRTF data generation unit 124.

The HRTF data generation unit 124 generates personalized HRTF data including the inverse correction data and the personalized HRTF between the speaker 23 and the ears. The personalized HRTF data generated by the HRTF data generation unit 124 is supplied to the HRTF file generation unit 126.

The reference information acquisition unit 125 acquires reference information based on the characteristics of the measurement environment and the device characteristics of the headphones 22.

Specifically, the reference information acquisition unit 125 acquires reference information for sound quality adjustment, based on the characteristics of the headphones 22. The reference information for sound quality adjustment is acquired based on the device characteristics such as individual variability, linearity, and THD (Total Harmonic Distortion).

For example, the reference information for sound quality adjustment is acquired based on the sound pressure distribution level (SPL (Sound Pressure Level)) and THD when a signal of each voltage is used.

The reference information acquisition unit 125 also acquires reference information for sound field adjustment based on the reverberation characteristics of the measurement environment. For example, the reference information for sound field adjustment is acquired based on the personalized HRTF between the speaker 23 and the ears.

Figure 8:
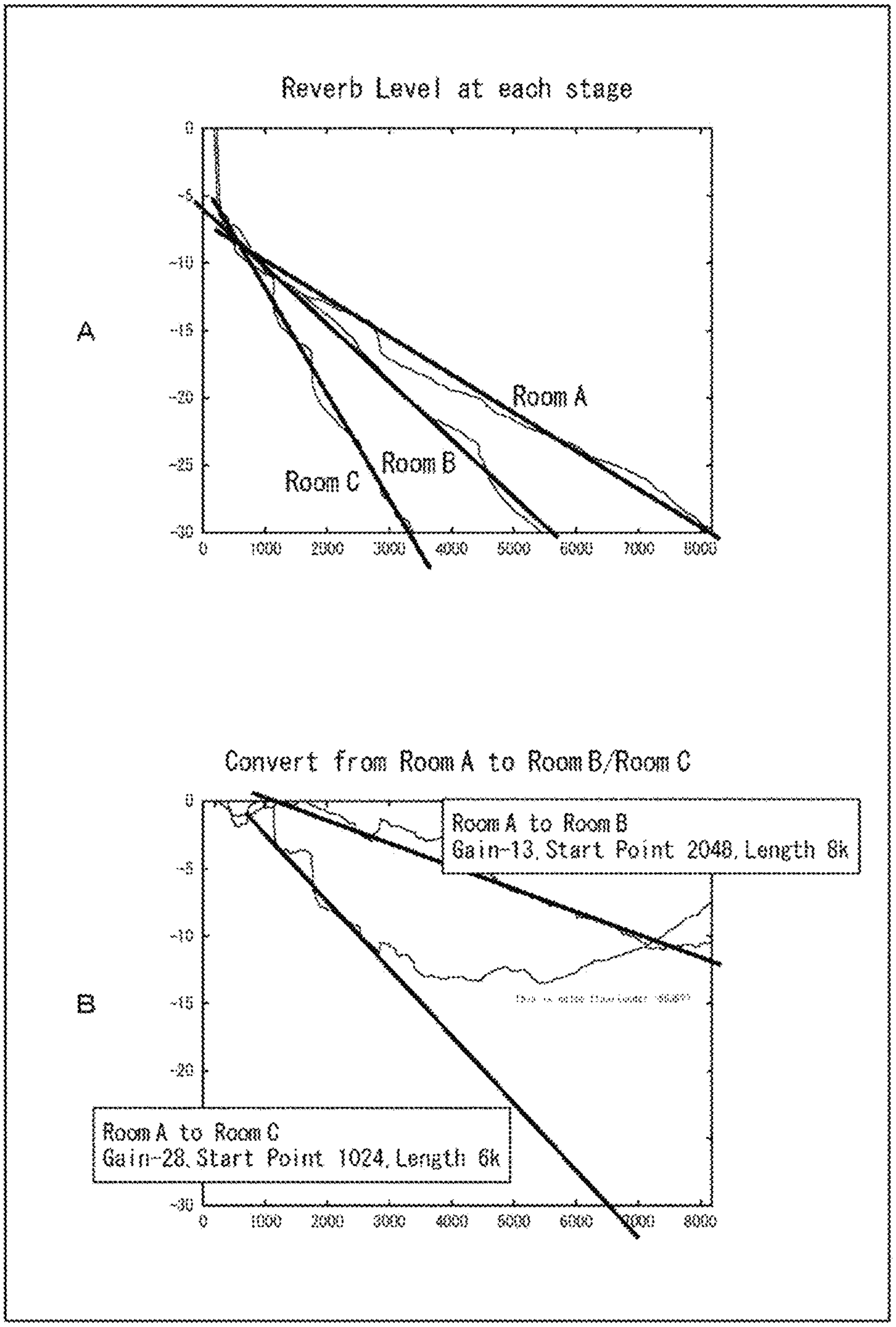
FIG. 8 is a diagram showing an example of reference information for sound field adjustment.

FIG. 8 is a diagram showing an example of reference information for sound field adjustment.

A in FIG. 8 represents the attenuation characteristics of reverberation components in three spaces, "Room A," "Room B," and "Room C." B in FIG. 8 represents the information for converting the reverberation component the space "Room A" into the reverberation components of the respective spaces "Room B" and "Room C." "Room A" represents a large room, corresponding to, for example, a movie theater, which is the measurement environment. "Room B" represents a medium-sized room, and "Room C" represents a small room.

Thus, the reference information acquisition unit 125 acquires information on the reverberation components in the measurement environment along with information for converting the reverberation components in the measurement environment into a reverberation component of a specified space, as the reference information.

The information representing the characteristics of the measurement environment or the device characteristics of the headphones 22 as described above is, for example, input to the reference information acquisition unit 125 of FIG. 7 prior to the measurement of the personalized HRTF. The reference information acquired by the reference information acquisition unit 125 is supplied to the HRTF file generation unit 126.

The HRTF file generation unit 126 generates a personalized HRTF file by adding a header portion including the reference information supplied by the reference information acquisition unit 125 to the personalized HRTF data supplied by the HRTF data generation unit 124. The header portion includes, as attribute information, information representing the measurement location, the user name, and the model name of the headphones 22 along with the reference information.

• Configuration of Adjustment Value Recording Unit

Figure 9:
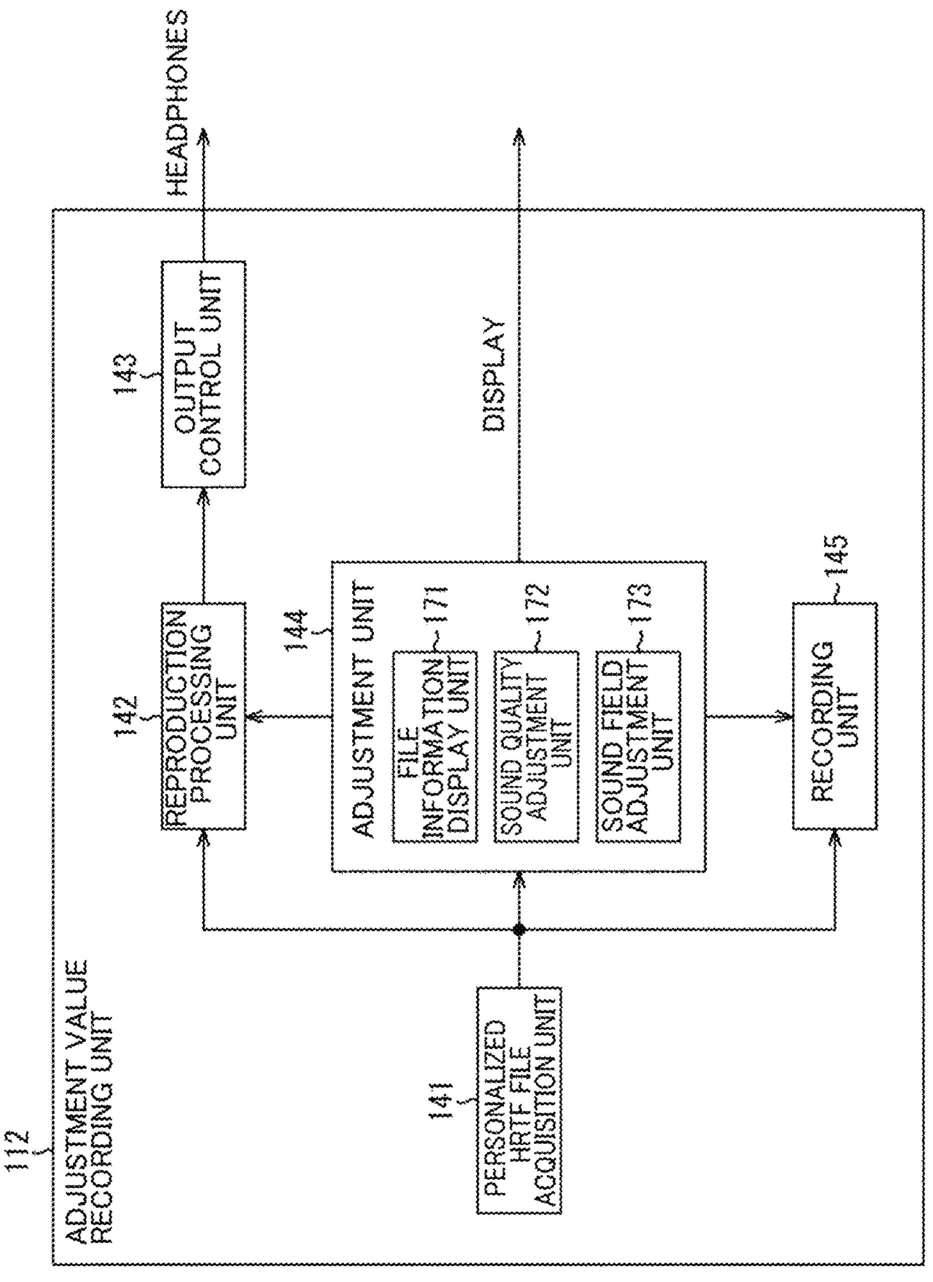
FIG. 9 is a block diagram showing a configuration example of an adjustment value recording unit.

FIG. 9 is a block diagram showing a configuration example of the adjustment value recording unit 112.

The adjustment value recording unit 112 is composed of a personalized HRTF file acquisition unit 141, a reproduction processing unit 142, an output control unit 143, an adjustment unit 144, and a recording unit 145.

The personalized HRTF file acquisition unit 141 acquires a personalized HRTF file supplied from the file generation unit 111. The personalized HRTF file acquired by the personalized HRTF file acquisition unit 141 is supplied to the reproduction processing unit 142, the adjustment unit 144, and the recording unit 145.

The reproduction processing unit 142 acquires an audio signal to be used in the adjustment of a personalized HRTF. For example, the same audio signal as a specified signal used in the measurement of a personalized HRTF is acquired.

The reproduction processing unit 142 reads the personalized HRTF data from the personalized HRTF file supplied by the personalized HRTF file acquisition unit 141, and generates a reproduced signal by performing, on the audio signal, binaural processing including convolution of the personalized HRTF.

The reproduction processing unit 142 adjusts the personalized HRTF based on the adjustment value supplied by the adjustment unit 144 as appropriate, and performs binaural processing using the adjusted personalized HRTF. The reproduced signal generated by the reproduction processing unit 142 is supplied to the output control unit 143.

The output control unit 143 causes the reproduced sound corresponding to the signal supplied from the reproduction processing unit 142 to be output from the headphones 22.

The adjustment unit 144 is composed of a file information display unit 171, a sound quality adjustment unit 172, and a sound field adjustment unit 173.

The file information display unit 171 displays, on the adjustment screen, the contents of attribute information included in the header portion of the personalized HRTF file supplied from the personalized HRTF file acquisition unit 141. During the adjustment of the personalized HRTF data, the adjustment screen, which is a GUI (Graphical User Interface) used for the adjustment of the personalized HRTF data, is displayed on the display 1A.

When adjusting the sound quality, the sound quality adjustment unit 172 displays information representing the inverse correction data and other information on the adjustment screen. The inverse correction data is included in the personalized HRTF data of the personalized HRTF file supplied from the personalized HRTF file acquisition unit 141. The sound quality adjustment unit 172 also causes the contents of the reference information included in the header portion of the personalized HRTF file to be displayed on the adjustment screen.

The sound quality adjustment unit 172 acquires the adjustment value of the inverse correction data as a sound quality adjustment value according to an operation by the producer.

The sound field adjustment unit 173 displays, on the adjustment screen, information representing reverberation components based on the personalized HRTF between the speaker 23 and the ears and other information when the sound field is adjusted. The personalized HRTF between the speaker 23 and the ears is included in the personalized HRTF data of the personalized HRTF file supplied from the personalized HRTF file acquisition unit 141. The sound field adjustment unit 173 also displays the contents of the reference information contained in the header portion of the personalized HRTF file on the adjustment screen.

The sound field adjustment unit 173 acquires the adjustment value of the personalized HRTF between the speaker 23 and the ears as a sound field adjustment value according to an operation by the producer.

Thus, the adjustment unit 144 functions as a presentation unit that displays the contents of attribute information, the contents of the reference information, personalized HRTF data and the like on the adjustment screen, and presents them to the producer (user). The sound quality adjustment values and sound field adjustment values acquired by the adjustment unit 144 are supplied to the reproduction processing unit 142 and the recording unit 145.

The recording unit 145 records the adjustment values supplied from the adjustment unit 144, in the header portion of the personalized HRTF file supplied from the personalized HRTF file acquisition unit 141.

Figure 10:
FIG. 10 is a diagram showing an example of information recorded in a personalized HRTF file.

FIG. 10 is a diagram showing an example of information recorded in a personalized HRTF file.

The personalized HRTF data are recorded in the personalized HRTF file, and header information is recorded in the header portion. As shown in the callout, the header information includes attribute information, reference information, and adjustment values.

The attribute information includes information representing the measurement location, information representing the user name, and information representing the model name of the headphones used for the measurement.

The information representing the measurement location is information representing the location of the measurement environment. In the case of the example described above, information on the movie theater used as the measurement environment is recorded as information representing the measurement location. For example, the producer who adjusts a personalized HRTF can identify the measurement environment based on the information representing the measurement location.

The information representing the user name is information representing the producer who performs editing using the personalized HRTF.

The information representing the model name of the headphones used for the measurement includes information representing the manufacturer of the headphones 22, and the identification information of the model name and the like.

The reference information includes reference information for sound quality adjustment and reference information for sound field adjustment.

The reference information for sound quality adjustment includes, for example, Split Freq and Limit Gain.

Split Freq represents a frequency that serves as a boundary to which a certain correction value is applied. For bands greater than Split Freq, correction is performed using a certain correction value. Limit Gain represents the maximum value of gain that is the correction value.

The reference information for sound field adjustment includes, for example, Gain, Start Point, and Length.

Gain represents the gain used as a correction value for a reverberation component. Start Point represents the starting position of attenuation. Length represents the range of application of a certain attenuation rate.

Each piece of the information described above is recorded as header information together with adjustment values consisting of sound quality adjustment values and sound field adjustment values, to constitute a personalized HRTF file. The personalized HRTF file that has the information on an adjustment value recorded in the header portion is provided to the reproducing device 31.

<Operation of Information Processing Device>

The processing of the information processing device 1 having the configuration described above will be described below.

• Personalized HRTF File Generation Processing

Figure 11:
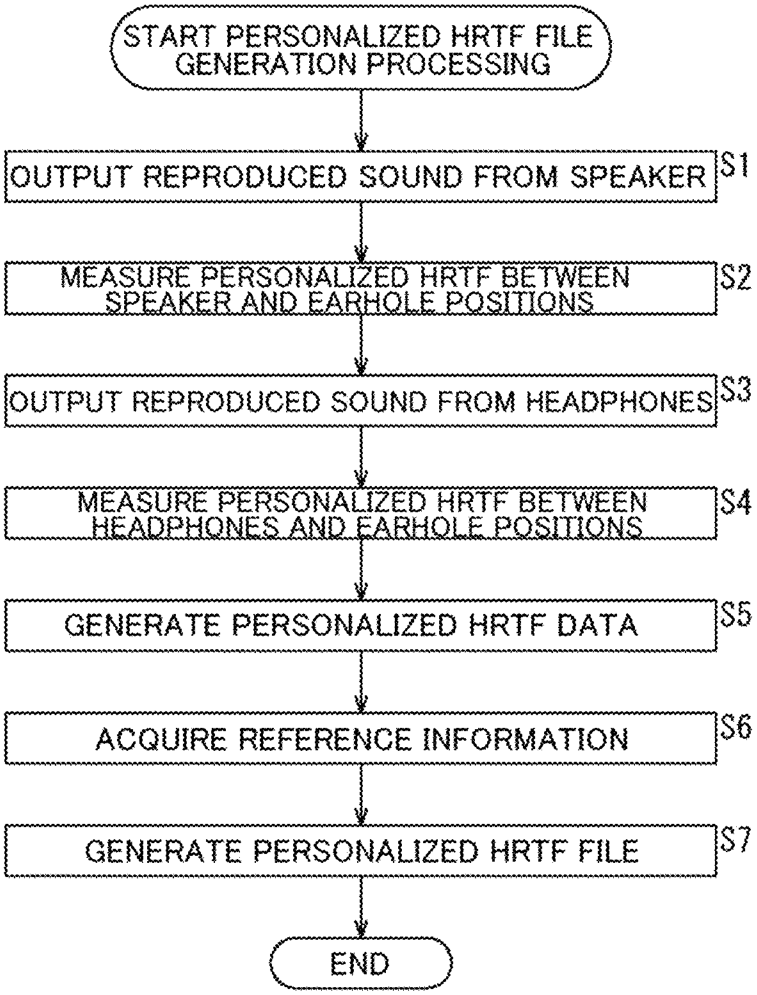
FIG. 11 is a flowchart for explaining HRTF file generation processing performed by the information processing device in the measurement environment.

Referring to the flowchart shown in FIG. 11, personalized HRTF file generation processing performed by the information processing device 1 in the measurement environment is now described.

Here, all of the steps shown in FIG. 11 are described as being performed by the information processing device 1, but these steps may be performed by other devices provided in the measurement environment, as appropriate. As described above, the measurement of a personalized HRTF is performed with, for example, the producer as a listener sitting in a predetermined seat in a movie theater and putting the microphone 21 on an earhole.

In step S1, the output control unit 122 causes reproduced sound to be output from the speaker 23 of the movie theater.

In step S2, the HRTF acquisition unit 123 measures the personalized HRTF between the speaker 23 and the ears based on the result of sound collection by the microphone 21. After the measurement of the personalized HRTF between the speaker 23 and the ears, the producer puts on the headphones 22 so as to cover the ears to which the microphone 21 is attached.

In step S3, the output control unit 122 causes the reproduced sound to be output from the headphones 22 worn by the producer.

In step S4, the HRTF acquisition unit 123 measures the personalized HRTF between the headphones 22 and the ears based on the result of sound collection by the microphone 21.

In step S5, the HRTF data generation unit 124 generates personalized HRTF data containing the personalized HRTF between the headphones 22 and the ears and the inverse correction data of the personalized HRTF between the speaker 23 and the ears.

In step S6, the reference information acquisition unit 125 acquires reference information based on the characteristics of the headphones 22 and the measurement environment.

In step S7, the HRTF file generation unit 126 generates a personalized HRTF file in which the header information including reference information and the personalized HRTF data are recorded.

The above description assumes that the personalized HRTF is measured using the microphone 21, but the personalized HRTF between the speaker 23 and the ears may be acquired based on an ear image obtained by photographing the ears of the producer. In this case, an inference model for personalized HRTF inference that is generated in advance by machine learning or the like is used. The inference model for personalized HRTF inference is an inference model that takes the ear image as an input and the personalized HRTF as an output.

• Personalized HRTF Adjustment Processing

Referring to the flowchart shown in FIG. 12, personalized HRTF adjustment processing performed by the information processing device 1 in the measurement environment will be described below.

In step S21, the file information display unit 171 performs file information display processing. The file information display processing reads the personalized HRTF file and displays the contents of attribute information and other and the like. The file information display processing is described below with reference to the flowchart shown in FIG. 13.

In step S22, the sound quality adjustment unit 172 performs sound quality adjustment processing. The sound quality adjustment processing adjusts the inverse correction data and records a sound quality adjustment value in the personalized HRTF file. The sound quality adjustment processing is described below with reference to the flowchart shown in FIG. 15.

In step S23, the sound field adjustment unit 173 performs sound field adjustment processing. The sound field adjustment processing adjusts the personalized HRTF data between the speaker 23 and the ears and records a sound field adjustment value in the personalized HRTF file. The sound field adjustment processing is described below with reference to FIG. 18.

• File Information Display Processing

Figure 12:
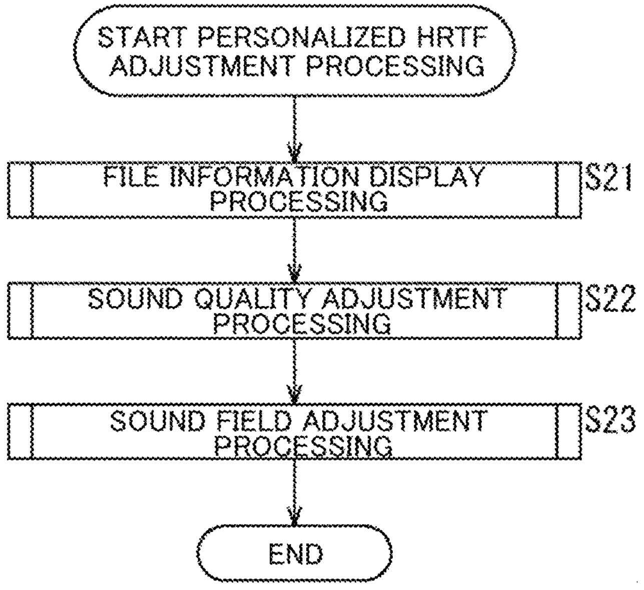
FIG. 12 is a flowchart for explaining personalized HRTF adjustment processing performed by the information processing device in the measurement environment.
Figure 13:
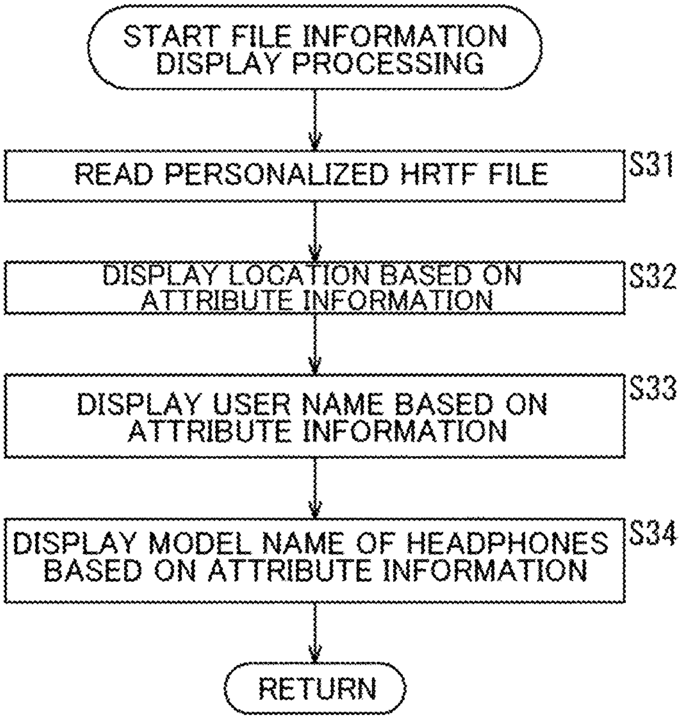
FIG. 13 is a flowchart for explaining file information display processing.

Referring to the flowchart shown in FIG. 13, the file information display processing performed in step S21 of FIG. 12 is described.

In step S31, the adjustment unit 144 reads the personalized HRTF file. By reading the personalized HRTF file, the personalized HRTF data between the speaker and the ears and the inverse correction data are acquired. In addition, the attribute information and the reference information are acquired.

In step S32, the file information display unit 171 displays the information representing the measurement location, based on the attribute information.

In step S33, the file information display unit 171 displays the information representing the user name, based on the attribute information.

In step S34, the file information display unit 171 displays the information representing the model name of the headphones 22 used for the measurement, based on the attribute information.

Figure 14:
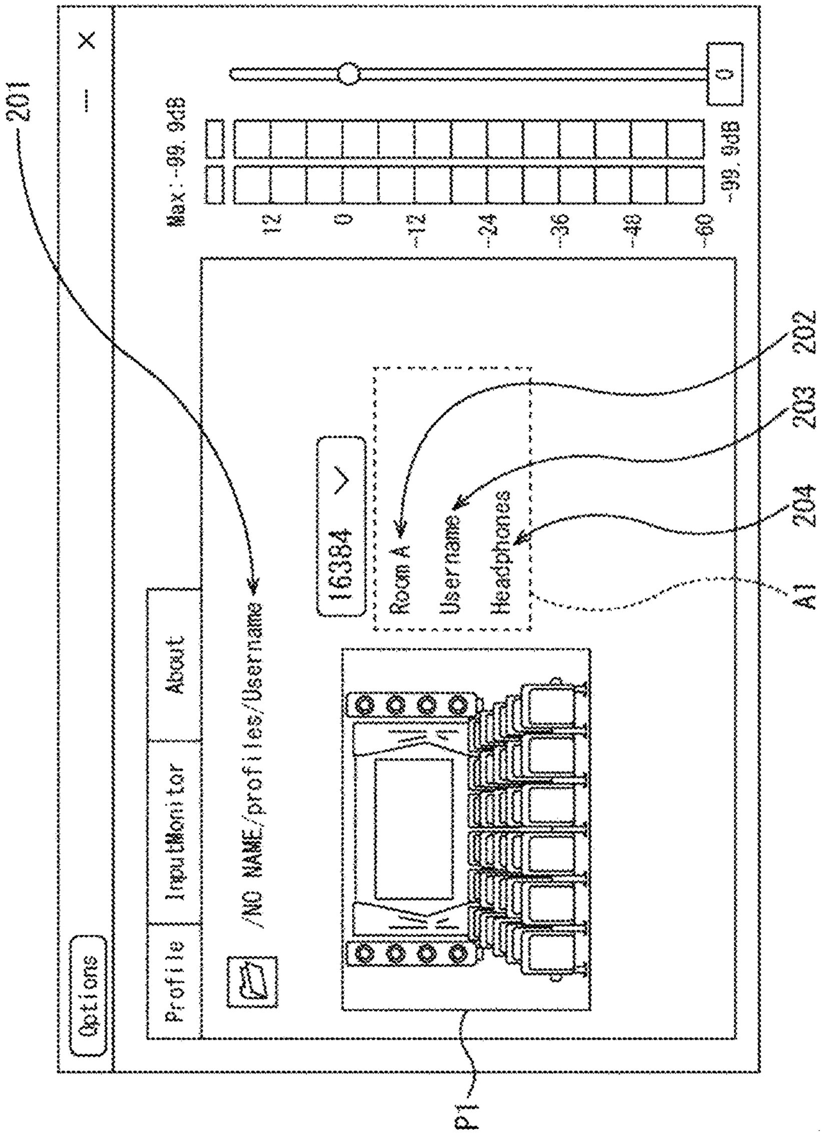
FIG. 14 is a diagram showing an example of displaying attribute information.

FIG. 14 is a diagram showing an example of displaying the attribute information.

The screen shown in FIG. 14 is displayed as a main screen of the adjustment screen used for the adjustment of the personalized HRTF data. An item 201 at the top of the screen represents a personalized HRTF file to be adjusted. In the example shown in FIG. 14, "/No Name/profiles/Username" is displayed as the personalized HRTF file to be adjusted.

An image P1, which is an image representing the measurement location, is displayed below an item 201. An area A1, which is a display area for the attribute information, is formed on the right side of the image P1. In the area A1, three types of information, items 202 through 204, are displayed.

The item 202 represents the name of the measurement location. In the example shown in FIG. 14, "Room A" is displayed as the name of the measurement location.

An item 203 represents the user name. In the example shown in FIG. 14, "Username" is displayed as the user name.

An item 204 represents the model name of the headphones used for the measurement. In the example shown in FIG. 14, "Headphones" is displayed as the model name of the headphones.

The producer can confirm the personalized HRTF file to be adjusted and information on the measurement environment by looking at the display of the items 201 to 204.

After the attribute information is displayed in this manner, the processing returns to step S21 in FIG. 12 and subsequent processing is performed.

• Sound Quality Adjustment Processing

Figure 15:
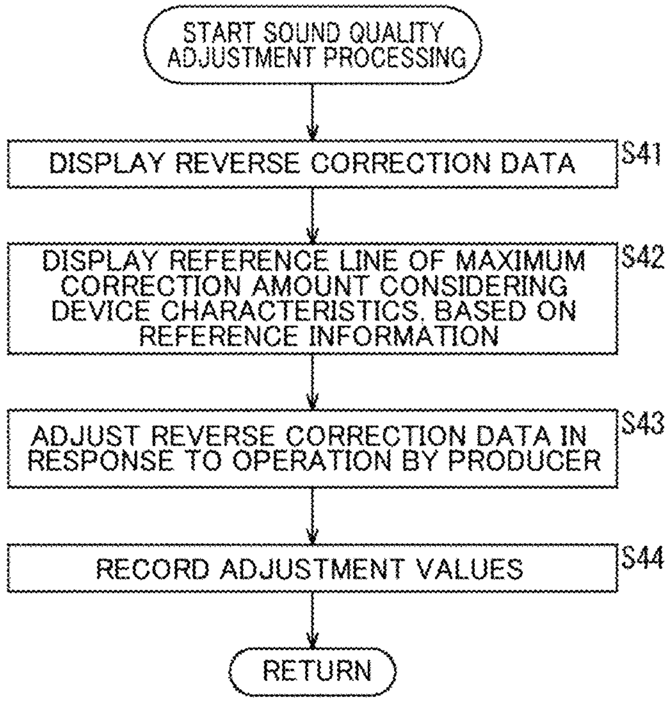
FIG. 15 is a flowchart for explaining sound quality adjustment processing.

Referring to the flowchart shown in FIG. 15, the sound quality adjustment processing performed in step S22 of FIG. 12 is explained.

The sound quality adjustment processing is started, for example, when sound quality adjustment is instructed to be performed on the main screen shown in FIG. 14. As described above, the sound quality adjustment is performed by adjusting the inverse correction data representing the inverse characteristics of the personalized HRTF between the headphones 22 and the ears.

In step S41, the sound quality adjustment unit 172 displays information representing the inverse correction data.

In step S42, the sound quality adjustment unit 172 displays a reference line of the maximum correction amount taking into consideration the device characteristics of the headphones 22, based on the reference information.

Figure 16:
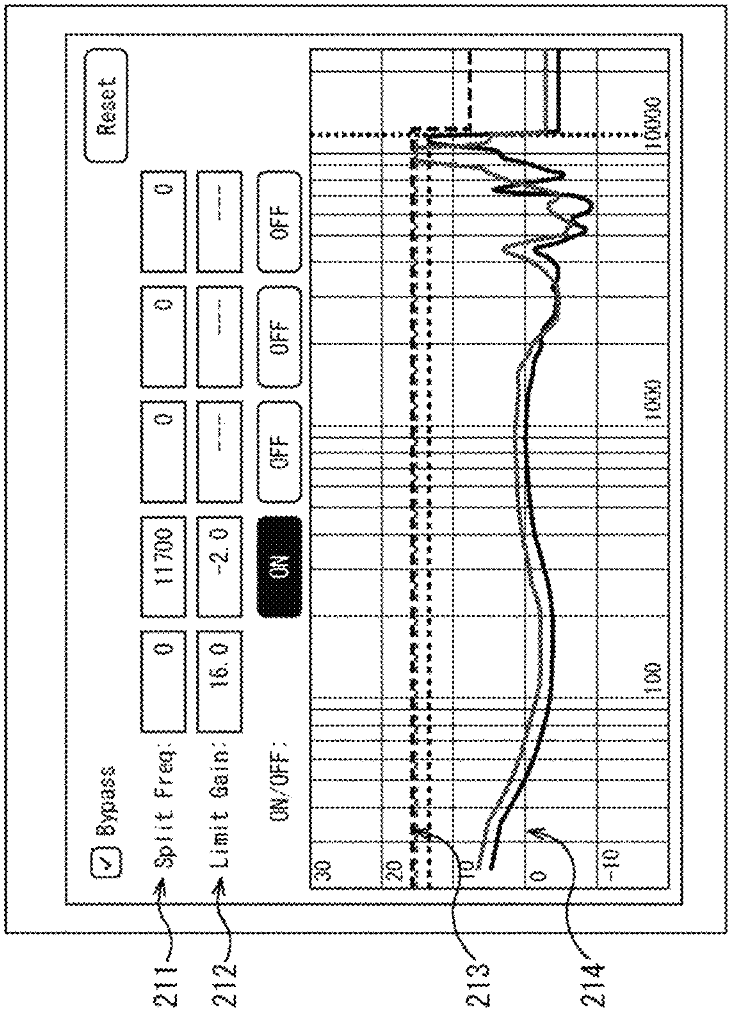
FIG. 16 is a diagram showing an example of displaying a sound quality adjustment screen.

FIG. 16 is a diagram showing an example of displaying the sound quality adjustment screen.

As shown in FIG. 16, the contents of the reference information for sound quality adjustment are displayed above the sound quality adjustment screen.

An item 211 is "Split Freq," which represents the frequency that is the boundary for applying a certain correction. In the example shown in FIG. 16, "11700" Hz is displayed as the frequency which is the boundary.

An item 212 is "Limit Gain," which represents the maximum value of the gain to be the correction value. In the example shown in FIG. 16, "16.0" (dB) is displayed as the maximum value of gain for frequencies equal to or below 11700 Hz, and "−2.0" (dB) is displayed as the maximum value of gain for frequencies equal to and above 11700 Hz.

Figure 17:
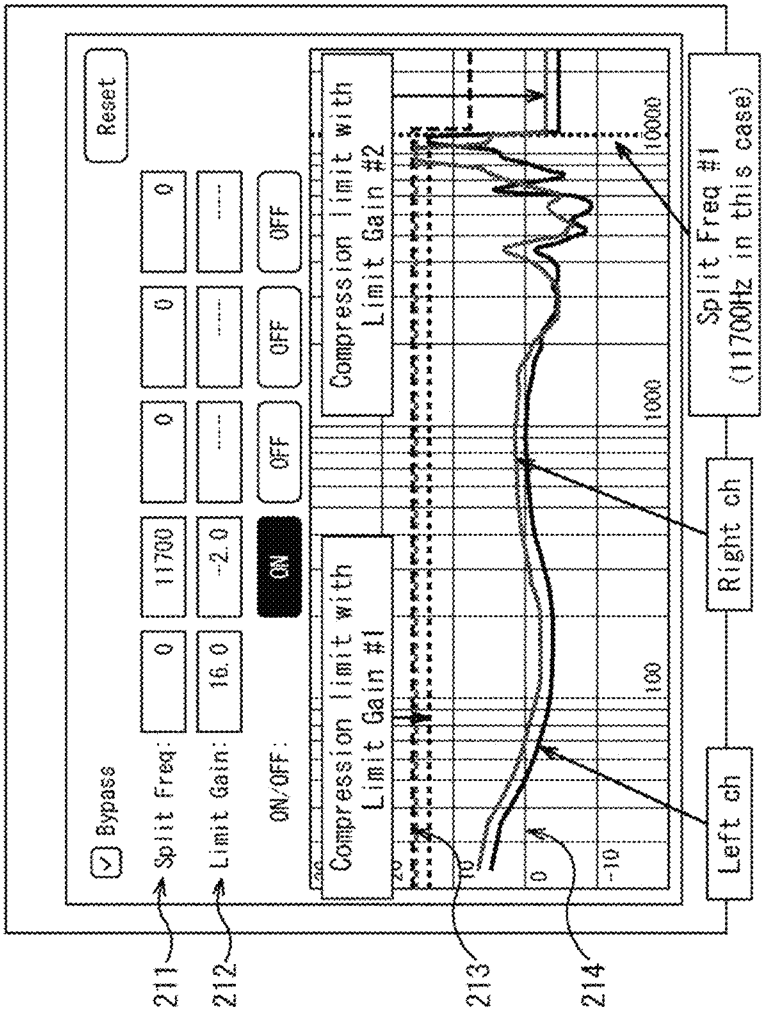
FIG. 17 is a diagram showing contents of each piece of information on the sound quality adjustment screen.

A reference line 213 is displayed at the bottom of the screen, along with a waveform 214 that represents the inverse correction data. A waveform 214 represents the inverse correction data for an L channel and the inverse correction data for an R channel. The reference line 213 represents the maximum correction amount taking into consideration the device characteristics of the headphones 22. The contents of each piece of information are shown in FIG. 17.

The producer can check what value the gain needs to be, by looking at the reference line 213. The producer adjusts the reference information for sound quality adjustment represented by "Split Freq" and "Limit Gain" by moving the display on the waveform 214.

Returning to the explanation of FIG. 15, in step S43, the sound quality adjustment unit 172 adjusts the inverse correction data according to an operation by the producer. The sound quality adjustment unit 172 sets the sound quality adjustment value, which is the adjustment value of the inverse correction data, according to an operation by the producer. Reproduction using the inverse correction data after adjustment using the sound quality adjustment value is performed by the reproduction processing unit 142 as appropriate.

In step S44, the recording unit 145 records sound quality adjustment value in the header portion of the personalized HRTF file.

After the sound quality adjustment values are recorded, the processing returns to step S22 in FIG. 12 and subsequent processing is performed.

• Sound Field Adjustment Processing

Figure 18:
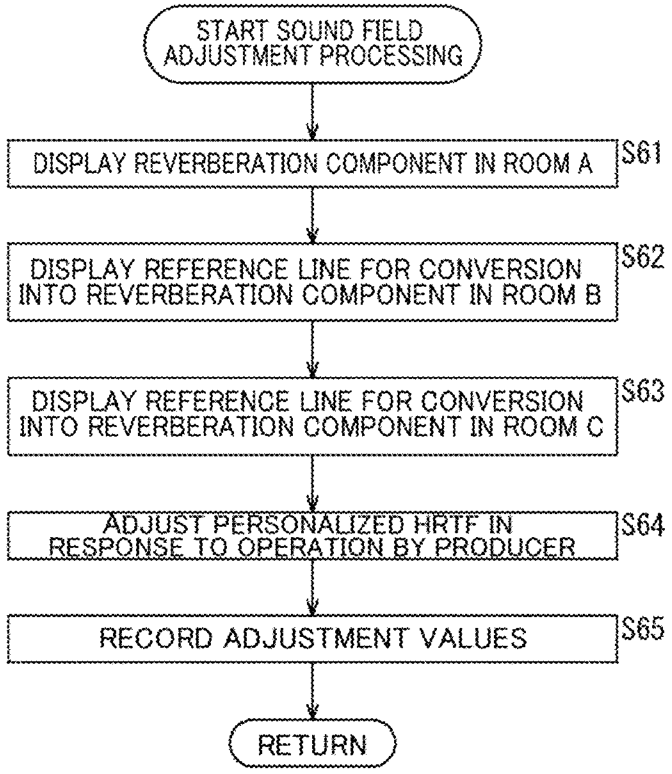
FIG. 18 is a flowchart for explaining sound field adjustment processing.

Referring to the flowchart shown in FIG. 18, the sound field adjustment processing performed in step S23 of FIG. 12 is now explained.

The sound field adjustment processing is started, for example, when sound field adjustment is instructed to be performed on the main screen shown in FIG. 14.

In step S61, the sound field adjustment unit 173 displays information representing the reverberation component in the room A based on the personalized HRTF between the speaker 23 and the ears. The room A is, for example, a movie theater, which is the measurement environment.

In step S62, the sound field adjustment unit 173 displays a reference line for converting the reverberation component of the room A to the reverberation component of the room B based on the reference information.

In step S63, the sound field adjustment unit 173 displays a reference line for converting the reverberation component of the room A to the reverberation component of the room C based on the reference information.

Figure 19:
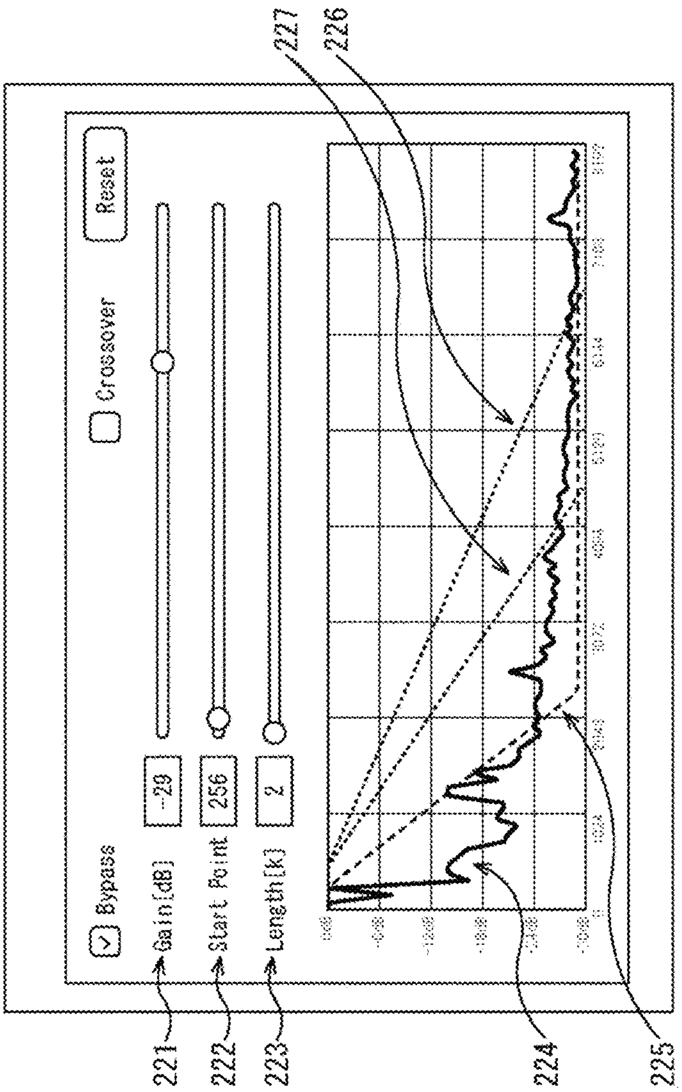
FIG. 19 is a diagram showing an example of displaying a sound field adjustment screen.

FIG. 19 shows an example of displaying the sound field adjustment screen.

Figure 20:
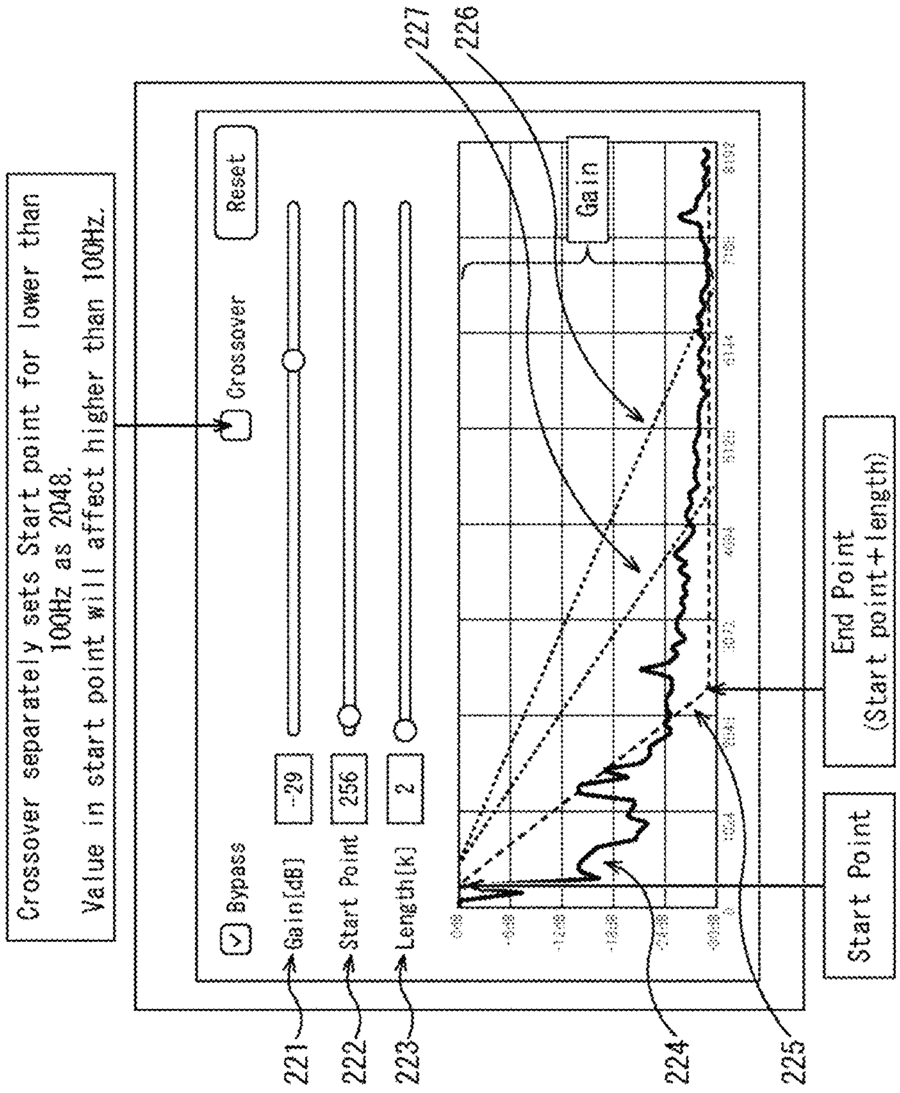
FIG. 20 is a diagram showing contents of each piece of information of the sound field adjustment screen.

As shown in FIG. 19, the contents of the reference information for sound field adjustment are displayed above the sound field adjustment screen. The contents of each piece of information are shown in FIG. 20.

An item 221 is "Gain," which represents the gain used as the correction value for the reverberation component. In the example shown in FIG. 19, "−29" dB is displayed as the gain An item 222 is "Start Point" which represents the starting position of attenuation. In the example shown in FIG. 19, a value of "256" is displayed as the start position of attenuation.

An item 223 is "Length" that represents the range of application of a certain attenuation rate. In the example shown in FIG. 19, "2" k is displayed as the applicable range of attenuation rate.

Reference lines 225 through 227 are displayed at the bottom of the screen, along with the waveform 224, which represents the reverberation component. The reference line 225 represents the attenuation characteristics of the reverberation component in the measurement environment. The reference line 225 represents the start position, end position, and gain of the reverberation component in the measurement environment.

The reference line 226 is a reference line for converting the reverberation component of the measurement environment into the reverberation component of "Room B," and represents the attenuation characteristics of "Room B." The reference line 227 is a reference line for converting the reverberation component of the measurement environment into the reverberation component of "Room C," and represents the attenuation characteristics of "Room C."

The producer can check how much the reverberation component needs to be corrected, by looking at the reference line 226 and the reference line 227. The producer adjusts the reference information for sound field adjustment represented by "Gain," "Start Point," and "Length" by inputting numerical values in the fields of the items 221 to 223 or by moving a slide bar displayed next to the items 221 to 223.

Returning to the explanation of FIG. 18, in step S64, the sound field adjustment unit 173 adjusts the personalized HRTF between the speaker 23 and the ears according to an operation by the producer. The sound field adjustment unit 173 sets the sound field adjustment value, which is the adjustment value of the personalized HRTF between the speaker 23 and the ears, according to an operation by the producer. Reproduction using the personalized HRTF after adjustment using the sound field adjustment value is performed by the reproduction processing unit 142 as appropriate.

In step S65, the recording unit 145 records the sound field adjustment values in the header portion of the personalized HRTF file.

After the sound field adjustment values are recorded, the processing returns to step S23 in FIG. 12 and subsequent processing is performed. The personalized HRTF file generated by the above series of processes is provided to the reproducing device 31.

4. Configuration and Operation of Reproducing Device

<Configuration of Reproducing Device>

Figure 21:
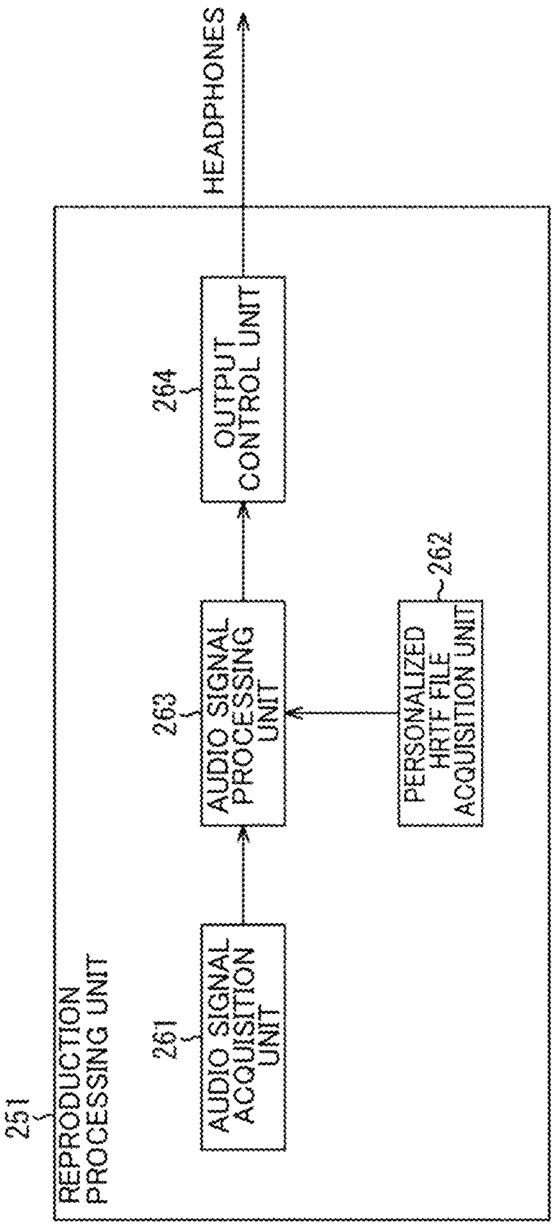
FIG. 21 is a block diagram showing a functional configuration example of a reproducing device.

FIG. 21 is a block diagram showing a functional configuration example of the reproducing device 31.

In the reproducing device 31, the reproduction processing unit 251 is implemented by the execution of a predetermined program by the CPU of the PC that constitutes the reproducing device 31.

The reproduction processing unit 251 is composed of an audio signal acquisition unit 261, a personalized HRTF file acquisition unit 262, an audio signal processing unit 263, and an output control unit 264. At least a part of the configuration of the reproduction processing unit 251 may be implemented in other devices provided in the reproduction environment.

The audio signal acquisition unit 261, for example, acquires audio signals of audio of a movie to be edited, and outputs them to the audio signal processing unit 263.

The personalized HRTF file acquisition unit 262 acquires the personalized HRTF file provided by the information processing device 1 and outputs it to the audio signal processing unit 263.

The audio signal processing unit 263 reads personalized HRTF data from the personalized HRTF file supplied from the personalized HRTF file acquisition unit 262 and generates a reproduced signal by performing binaural processing on the audio signal supplied by the audio signal acquisition unit 261.

The audio signal processing unit 263 adjusts the personalized HRTF data based on the adjustment values included in the header portion of the personalized HRTF file as appropriate, and performs binaural processing using the adjusted personalized HRTF. The reproduced signal generated by the audio signal processing unit 263 is supplied to the output control unit 264.

The output control unit 264 causes the reproduced sound corresponding to the reproduced signal supplied from the audio signal processing unit 263, to be output from the headphones 32.

<Operation of Reproducing Device>

Figure 22:
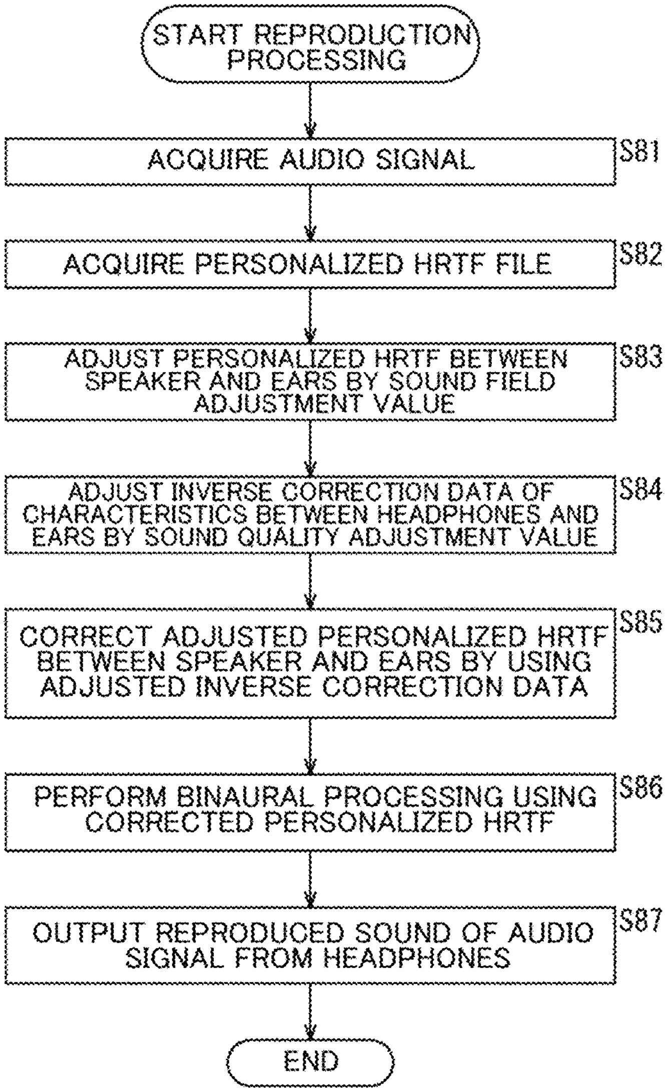
FIG. 22 is a flowchart for explaining reproduction processing performed by the reproducing device in the reproduction environment.

Referring to the flowchart shown in FIG. 22, the reproduction processing performed by reproducing device 31 in the reproduction environment is now described.

In step S81, the audio signal acquisition unit 261 acquires an audio signal of audio of a movie.

In step S82, the personalized HRTF file acquisition unit 262 acquires a personalized HRTF file provided by the information processing device 1.

In step S83, the audio signal processing unit 263 adjusts the personalized HRTF between the speaker 23 and the ears using the sound field adjustment value. The personalized HRTF between the speaker 23 and the ears is acquired from the personalized HRTF data of the personalized HRTF file, and the sound field adjustment value is acquired from the header portion of the personalized HRTF file.

In step S84, the audio signal processing unit 263 adjusts the inverse correction data of the characteristics between the headphones 22 and the ears by using the sound quality adjustment values. The inverse correction data is acquired from the personalized HRTF data of the personalized HRTF file, and sound quality adjustment values are acquired from the header portion of the personalized HRTF file.

In step S85, the audio signal processing unit 263 corrects the personalized HRTF between the adjusted speaker 23 and the ears by using the adjusted inverse correction data. Specifically, the correction is performed by superimposing the inverse characteristics of the adjusted personalized HRTF between headphones 22 and the ears on the adjusted personalized HRTF between the speaker 23 and the ears.

In step S86, the audio signal processing unit 263 performs binaural processing on the audio signal of the audio of the movie by using the corrected personalized HRTF. The binaural processing generates a reproduced signal.

In step S87, the output control unit 264 causes the reproduced sound corresponding to the reproduced signal to be output from the headphones 32.

As described above, the producer of the audio of the movie can adjust the HRTF personalized to himself/herself. By making it possible to adjust the personalized HRTF itself, it is possible to reproduce the sound quality and sound field required in the production of audio and music for a movie.

5. Modifications

Although overhead headphones are assumed to be used as the audio output device, inner-ear headphones (earphones) may also be used. In addition, speakers may also be used as the audio output device instead of headphones.

Although it is assumed that the personalized HRTF is adjusted in the measurement environment, the personalized HRTF may be adjusted in an environment different from the measurement environment. In this case, the producer adjusts the personalized HRTF data using the headphones 22 brought back from the measurement environment.

Although the sound production system shown in FIG. 1 is assumed to be used for the production of audio for movies, the sound production system shown in FIG. 1 can be applied to systems used for various types of audio production, such as systems used for the production of music and systems used for the production of audio for television programs.

The personalized HRTF data may be adjusted as described above when sound is reproduced on consumer devices, rather than when sound of contents is produced.

Although information recorded in the form of HRTF, which is frequency domain information, is assumed to be used as the head related transfer function representing the transfer characteristics of sound, information recorded in the form of HRIR (Head Related Impulse Response), which is time domain information, may also be used.

• Configuration Example of Computer

The series of processes described above can be executed by hardware or software. When the series of processes is executed by software, a program constituting the software is installed from a program recording medium onto a computer built in dedicated hardware or a general-purpose personal computer.

Figure 23:
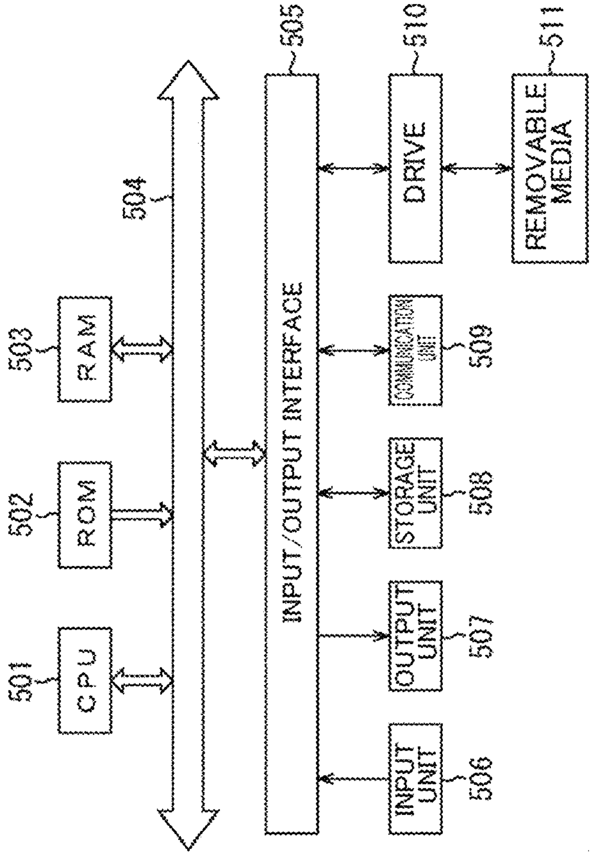
FIG. 23 is a block diagram showing an example of a configuration of computer hardware.

FIG. 23 is a block diagram showing an example of a configuration of computer hardware that executes the above-described series of processes using a program. The information processing device 1 and the reproducing device 31 are composed of PCs having the same configuration as the configuration shown in FIG. 23.

A CPU (Central Processing Unit) 501, a ROM (Read Only Memory) 502, and a RAM (Random Access Memory) 503 are connected with one another by a bus 504.

An input/output interface 505 is additionally connected to the bus 504. An input unit 506 functioning as a keyboard, a mouse, or the like, and an output unit 507 functioning as a display, a speaker, or the like are connected to the input/output interface 505. In addition, a storage unit 508 including a hard disk, a non-volatile memory, and the like, a communication unit 509 including a network interface and the like, and a drive 510 that drives a removable medium 511, are connected to the input/output interface 505.

In the computer that has the above configuration, for example, the CPU 501 performs the above-described series of processes by loading a program stored in the storage unit 508 to the RAM 503 via the input/output interface 505 and the bus 504 and executing the program.

The program executed by the CPU 501 is recorded on, for example, the removable medium 511 or is provided via a wired or wireless transfer medium such as a local area network, the Internet, or a digital broadcast, and installed in the storage unit 508.

The program executed by the computer may be a program that performs processing in time series in the order described in the present specification or may be a program that performs processing in parallel or at a necessary timing such as when a call is made.

Meanwhile, in the present specification, a system is a collection of a plurality of constituent elements (devices, modules (parts), or the like), and all the constituent elements may be located or not located in the same housing. Thus, a plurality of devices housed in separate housings and connected via a network, and one device in which a plurality of modules are housed in one housing are both systems.

The effects described in the present specification are merely examples and are not intended as limiting, and other effects may be obtained.

The embodiments of the present technology are not limited to the aforementioned embodiments, and various changes can be made without departing from the gist of the present technology.

For example, the present technology may be configured as cloud computing in which a plurality of devices share and cooperatively process one function via a network.

In addition, each step described in the foregoing flowcharts can be executed by one device or executed in a shared manner by a plurality of devices.

Furthermore, in a case in which one step includes a plurality of processes, the plurality of processes included in this one step can be executed by one device or executed in a shared manner by a plurality of devices.

<Example of Combination of Configurations>

(1)

An information processing device, comprising an adjustment unit that adjusts personalized transfer characteristics, which are transfer characteristics of sound in a measurement environment and are personalized to a user, in response to an operation performed by the user.

(2)

The information processing device according to clause (1), further comprising a presentation unit that presents, to the user, contents of reference information referred to at the time of adjusting the personalized transfer characteristics, along with the personalized transfer characteristics.

(3)

The information processing device according to clause (2), wherein the adjustment unit adjusts the personalized transfer characteristics that are measured based on reproduced sound output from an output device worn by the user.

(4)

The information processing device according to clause (3), wherein the presentation unit presents contents of the reference information acquired based on device characteristics of the output device.

(5)

The information processing device according to any one of clauses (2) to (4), wherein the adjustment unit adjusts the personalized transfer characteristics that are measured based on reproduced sound output from a speaker installed the measurement environment.

(6)

The information processing device according to clause (5), wherein the presentation unit presents contents of the reference information acquired based on reverberation characteristics of sound in the measurement environment.

(7)

The information processing device according to clause (6), wherein the presentation unit presents contents of the reference information representing reverberation characteristics of sound in a specified space different from the measurement environment.

(8)

The information processing device according to any one of clauses (2) to (7), wherein the reference information is recorded in a header portion of a file in which data of the personalized transfer characteristics is recorded.

(9)

The information processing device according to clause (8), further comprising a recording unit that records, in the header portion, an adjustment value corresponding to an operation performed by the user.

(10)

The information processing device according to clause (8) or (9), wherein the presentation unit presents contents of attribute information including information representing a location of the measurement environment, information representing the user who uses the personalized transfer characteristics in a reproduction environment, and information representing an output device worn by the user.

(11)

The information processing device according to clause (10), wherein the attribute information is recorded in the header portion.

(12)

An information processing method causing an information processing device to:

adjust personalized transfer characteristics, which are transfer characteristics of sound in a measurement environment and are personalized to a user, in response to an operation performed by the user.

(13)

A program causing a computer to execute processing of adjusting personalized transfer characteristics, which are transfer characteristics of sound in a measurement environment and are personalized to a user, in response to an operation performed by the user.

(14)

A reproducing device, comprising a reproducing unit that adjusts personalized transfer characteristics, which are transfer characteristics of sound in a measurement environment and are personalized to a user, on the basis of an adjustment value set by adjustment performed by the user, and reproduces an audio signal using the adjusted personalized transfer characteristics.

(15)

The reproducing device according to clause 14, wherein the reproducing unit adjusts first personalized transfer characteristics that are measured based on reproduced sound output from a speaker installed in the measurement environment, and second personalized transfer characteristics that are measured based on reproduced sound output from an output device worn by the user.

(16)

The reproducing device according to clause (15), wherein the reproducing unit corrects the first personalized transfer characteristics by superimposing inverse characteristics of the adjusted second personalized transfer characteristics on the adjusted first personalized transfer characteristics, and reproduces an audio signal using the corrected first personalized transfer characteristics.

(17)

A reproduction method causing a reproducing device to:

adjust personalized transfer characteristics, which are transfer characteristics of sound in a measurement environment and are personalized to a user, on the basis of an adjustment value set by adjustment performed by the user; and reproduce an audio signal using the adjusted personalized transfer characteristics.

(18)

A program causing a computer to execute processing of adjusting personalized transfer characteristics, which are transfer characteristics of sound in a measurement environment and are personalized to a user, on the basis of an adjustment value set by adjustment performed by the user; and reproducing an audio signal using the adjusted personalized transfer characteristics.

REFERENCE SIGNS LIST

1 Information processing device
1A Display
21 Microphone
22 Headphones
31 Reproducing device
31A Display
32 Headphones
101 Information processing unit
111 File generation unit
112 Adjustment value recording unit
121 Reproduction processing unit
122 Output control unit
123 HRTF acquisition unit
124 HRTF data generation unit
125 Reference information acquisition unit
126 HRTF file generation unit
141 Personalized HRTF file acquisition unit
142 Reproduction processing unit
143 Output control unit
144 Adjustment unit
145 Recording unit
171 File information display unit
172 Sound quality adjustment unit
173 Sound field adjustment unit
251 Reproduction processing unit
261 Audio signal acquisition unit
262 Personalized HRTF file acquisition unit
263 Audio signal processing unit
264 Output control unit

The invention claimed is:

1. An information processing method comprising:
receiving personalized HRTF, which are transfer characteristics of sound in a measurement environment and are personalized to a user, and reference information which is related to characteristics of the measurement environment or output device characteristics of an output device which is used by HRTF measurement;
controlling the output of information related to the personalized HRTF and the reference information;
acquiring a user input for an adjustment of the personalized HRTF;
controlling the adjustment of the personalized HRTF based on the user input; and
controlling a display to display a reference line representing a maximum correction amount as the information related to the personalized HRTF and the reference information.

2. The information processing method according to claim 1, further comprising presentation, to the user, contents of reference information referred to at the time of adjusting the personalized HRTF, along with the personalized HRTF.

3. The information processing method according to claim 2, further comprising adjusting the personalized HRTF that are measured based on reproduced sound output from the output device worn by the user.

4. The information processing method according to claim 3, further comprising presenting contents of the reference information acquired based on device characteristics of the output device.

5. The information processing method according to claim 2, further comprising adjusting the personalized HRTF that are measured based on reproduced sound output from a speaker installed in the measurement environment.

6. The information processing method according to claim 5, further comprising presenting contents of the reference information acquired based on reverberation characteristics of sound in the measurement environment.

7. The information processing method according to claim 6, further comprising presenting contents of the reference information representing reverberation characteristics of sound in a specified space different from the measurement environment.

8. The information processing method according to claim 2, further comprising recording in a header portion of a file in which data of the personalized HRTF is recorded.

9. The information processing method according to claim 8, further comprising recording, in the header portion, an adjustment value corresponding to an operation performed by the user.

10. The information processing method according to claim 8, further comprising presenting contents of attribute information including information representing a location of the measurement environment, information representing the user who uses the personalized HRTF in a reproduction environment, and information representing an output device worn by the user.

11. The information processing method according to claim 10, further comprising recording the attribute information in the header portion.

12. The information processing method according to claim 1, wherein the personalized HRTF includes inverse correction data of the personalized HRTF.

13. The information processing method according to claim 12,
further comprising acquiring the input for adjustment of the inverse correction data of the personalized HRTF.

14. An information processing device, comprising circuitry configured to:
receive personalized HRTF, which are transfer characteristics of sound in a measurement environment and are personalized to a user, and reference information which is related to characteristics of the measurement environment or output device characteristics of an output device which is used by HRTF measurement;
control an output of information related to the personalized HRTF and the reference information;
acquire a user input for an adjustment of the personalized HRTF;
control the adjustment of the personalized HRTF based on the user input; and
control a display to display a reference line representing a maximum correction amount as the information related to the personalized HRTF and the reference information.

15. A non-transitory computer readable medium storing instructions that, when executed by a computer, cause the computer to execute the processes of:
receiving personalized HRTF, which are transfer characteristics of sound in a measurement environment and are personalized to a user, and reference information which is related to characteristics of the measurement environment or output device characteristics of an output device which is used by HRTF measurement;
controlling the output of information related to the personalized HRTF and the reference information;
acquiring a user input for an adjustment of the personalized HRTF;

controlling the adjustment of the personalized HRTF based on the user input; and controlling a display to display a reference line representing a maximum correction amount as the information related to the personalized HRTF and the reference information.

* * * * *